(12) United States Patent
Gao et al.

(10) Patent No.: US 12,088,828 B2
(45) Date of Patent: Sep. 10, 2024

(54) METHOD AND APPARATUS FOR IMPROVED WARP DELTA SIGNALING

(71) Applicant: Tencent America LLC, Palo Alto, CA (US)

(72) Inventors: Han Gao, San Diego, CA (US); Liang Zhao, Sunnyvale, CA (US); Xin Zhao, San Jose, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 127 days.

(21) Appl. No.: 17/981,842

(22) Filed: Nov. 7, 2022

(65) Prior Publication Data
US 2024/0048730 A1    Feb. 8, 2024

Related U.S. Application Data

(60) Provisional application No. 63/392,388, filed on Jul. 26, 2022.

(51) Int. Cl.
*H04N 19/176* (2014.01)
*H04N 19/102* (2014.01)
*H04N 19/51* (2014.01)

(52) U.S. Cl.
CPC ......... *H04N 19/176* (2014.11); *H04N 19/102* (2014.11); *H04N 19/51* (2014.11)

(58) Field of Classification Search
CPC .... H04N 19/102; H04N 19/176; H04N 19/51; H04N 19/527; H04N 19/54
See application file for complete search history.

(56) References Cited

U.S. PATENT DOCUMENTS

| | | | |
|---|---|---|---|
| 2013/0287103 A1 | 10/2013 | Seregin et al. | |
| 2017/0013279 A1 | 1/2017 | Puri et al. | |
| 2020/0154126 A1* | 5/2020 | Li | H04N 19/513 |
| 2021/0329257 A1 | 10/2021 | Sethuraman et al. | |

OTHER PUBLICATIONS

International Search Report dated Apr. 6, 2023 in International Application No. PCT/US2022/049232.
Written Opinion dated Apr. 6, 2023 in International Application No. PCT/US2022/049232.

\* cited by examiner

*Primary Examiner* — Dakshesh D Parikh
(74) *Attorney, Agent, or Firm* — Sughrue Mion, PLLC

(57) ABSTRACT

Systems and methods for encoding and decoding using warp motion modes are provided. A method includes receiving a bitstream that includes a coded picture; obtaining warp information that is signaled in the bitstream, the warp information including a warp type indicating a number of parameters to be corrected by delta values, the number of parameters defining warp motion for predicting a current block of the coded picture; obtaining at least one delta value from the bitstream that is a delta of at least one parameter that defines the warp motion for predicting the current block; obtaining a warp model based on the warp information and the at least one delta value; and predicting the current block by performing warped motion compensation using the warp model.

20 Claims, 15 Drawing Sheets

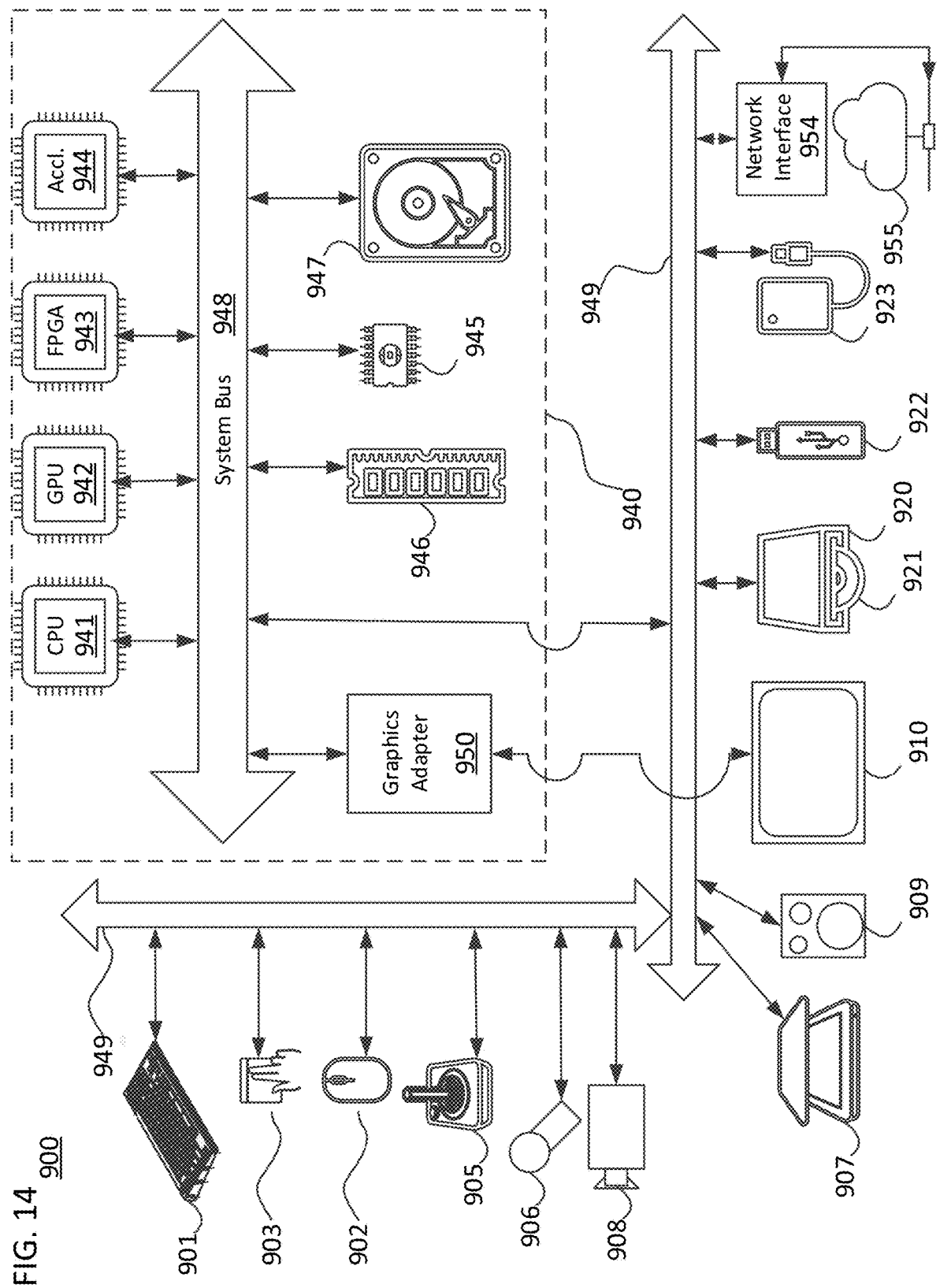

METHOD AND APPARATUS FOR IMPROVED WARP DELTA SIGNALING

CROSS-REFERENCE TO THE RELATED APPLICATION

This application claims priority from U.S. Provisional Application No. 63/392,388, filed on Jul. 26, 2022, the disclosure of which is incorporated herein by reference in its entirety.

FIELD

Embodiments of the present disclosure relate to advanced image and video coding technologies, and more particularly to improvements on local warp motion modes.

BACKGROUND

AOMedia Video 1 (AV1) is an open video coding format designed for video transmissions over the Internet. It was developed as a successor to VP9 by the Alliance for Open Media (AOMedia), a consortium founded in 2015 that includes semiconductor firms, video on demand providers, video content producers, software development companies and web browser vendors. Many of the components of the AV1 project were sourced from previous research efforts by Alliance members. Individual contributors started experimental technology platforms years before: Xiph's/Mozilla's Daala already published code in 2010, Google's experimental VP9 evolution project VP10 was announced on Sep. 12, 2014, and Cisco's Thor was published on Aug. 11, 2015. Building on the codebase of VP9, AV1 incorporates additional techniques, several of which were developed in these experimental formats. The first version 0.1.0 of the AV1 reference codec was published on Apr. 7, 2016. The Alliance announced the release of the AV1 bitstream specification on Mar. 28, 2018, along with a reference, software-based encoder and decoder. On Jun. 25, 2018, a validated version 1.0.0 of the specification was released. On Jan. 8, 2019 a validated version 1.0.0 with Errata 1 of the specification was released. The AV1 bitstream specification includes a reference video codec.

ITU-T VCEG (Q6/16) and ISO/IEC MPEG (JTC 1/SC 29/WG 11) published the H.265/HEVC (High Efficiency Video Coding) standard in 2013 (version 1) 2014 (version 2) 2015 (version 3) and 2016 (version 4). They have also explored the potential need for standardization of future video coding technology which could significantly outperform HEVC in compression capability. In October 2017, they issued the Joint Call for Proposals on Video Compression with Capability beyond HEVC (CfP). By Feb. 15, 2018, total 22 CfP responses on standard dynamic range (SDR), 12 CfP responses on high dynamic range (HDR), and 12 CfP responses on 360 video categories were submitted, respectively. In April 2018, all received CfP responses were evaluated in the 122 MPEG/10$^{th}$ JVET (Joint Video Exploration Team or Joint Video Expert Team) meeting. As a result of this meeting, WET formally launched the standardization of next-generation video coding beyond HEVC. The new standard is called Versatile Video Coding (VVC).

SUMMARY

According to embodiments of the present disclosure, a method performed by a decoder is provided. The method includes: receiving a bitstream that includes a coded picture; obtaining warp information that is signaled in the bitstream, the warp information including a warp type indicating a number of parameters to be corrected by delta values, the number of parameters defining warp motion for predicting a current block of the coded picture; obtaining at least one delta value from the bitstream that is a delta of at least one parameter that defines the warp motion for predicting the current block; obtaining a warp model based on the warp information and the at least one delta value; and predicting the current block by performing warped motion compensation using the warp model.

According to one or more embodiments of the present disclosure, the warp information includes the warp type, and the warp type is a rotation and zoom type that includes four parameters that define the warp motion, the at least one delta value that is obtained is two delta values for correcting two parameters among the four parameters, and the obtaining the warp model includes correcting the two parameters based on the two delta values.

According to one or more embodiments of the present disclosure, the warp information includes the warp type, and the warp type is an affine type that includes six parameters that define the warp motion, the at least one delta value that is obtained is four delta values for correcting four parameters among the six parameters, and the obtaining the warp model includes correcting the four parameters based on the four delta values.

According to one or more embodiments of the present disclosure, the warp information includes the number of parameters, which define the warp motion, that are to be corrected by the delta values, and a number of the at least one delta value that is obtained is equal to the number of parameters, of the warp information, that are to be corrected by the delta values.

According to one or more embodiments of the present disclosure, further includes obtaining an adaptive step size of the at least one delta value, and the obtaining the warp model includes obtaining the warp model based on the adaptive step size.

According to one or more embodiments of the present disclosure, the obtaining the adaptive step size includes: obtaining a scaling factor; and calculating the adaptive step size based on a predefined base step size and the scaling factor.

According to one or more embodiments of the present disclosure, the obtaining the scaling factor includes: obtaining an index that indicates the scaling factor from among a plurality of scaling factors stored within a look-up table; and obtaining the scaling factor based on the index and the look-up table.

According to one or more embodiments of the present disclosure, the obtaining the scaling factor includes deriving the scaling factor based on a magnitude of a translation motion vector of the current block.

According to one or more embodiments of the present disclosure, the obtaining the scaling factor includes deriving the scaling factor based on shear parameters.

According to one or more embodiments of the present disclosure, the obtaining the adaptive step size includes obtaining the adaptive step size based on at least one from among a block size, a prediction mode, a step size used by at least one neighboring block of the current block, one or more of predicted warp parameters, and whether a neighboring block of the current block was coded by a warp model or a translational model.

According to embodiments of the present disclosure, a system is provided. The system includes: at least one memory configured to store computer program code; and at least one processor configured to receive a bitstream that includes a coded picture, access the computer program code and operate as instructed by the computer program code. The computer program code includes: first obtaining code configured to cause the at least one processor to obtain warp information that is signaled in the bitstream, the warp information including a warp type indicating a number of parameters to be corrected by delta values, the number of parameters defining warp motion for predicting a current block of the coded picture; second obtaining code configured to cause the at least one processor to obtain at least one delta value from the bitstream that is a delta of at least one parameter that defines the warp motion for predicting the current block; third obtaining code to cause the at least one processor to obtain a warp model based on the warp information and the at least one delta value; and warped motion compensation code configured to cause the at least one processor to predict the current block by performing warped motion compensation using the warp model.

According to one or more embodiments of the present disclosure, the warp information includes the warp type, and the warp type is a rotation and zoom type that includes four parameters that define the warp motion, the at least one delta value that is obtained is two delta values for correcting two parameters among the four parameters, and the third obtaining code is configured to cause the at least one processor to correct the two parameters based on the two delta values.

According to one or more embodiments of the present disclosure, the warp information includes the warp type, and the warp type is an affine type that includes six parameters that define the warp motion, the at least one delta value that is obtained is four delta values for correcting four parameters among the six parameters, and the third obtaining code is configured to cause the at least one processor to correct the four parameters based on the four delta values.

According to one or more embodiments of the present disclosure, the warp information includes the number of parameters, which define the warp motion, that are to be corrected by the delta values, and a number of the at least one delta value that is obtained is equal to the number of parameters, of the warp information, that are to be corrected by the delta values.

According to one or more embodiments of the present disclosure, the computer program code further includes fourth obtaining code configured to cause the at least one processor to obtain an adaptive step size of the at least one delta value, and the third obtaining code is configured to cause the at least one processor to obtain the warp model based on the adaptive step size.

According to one or more embodiments of the present disclosure, the fourth obtaining code is configured to cause the at least one processor to: obtain a scaling factor; and calculate the adaptive step size based on a predefined base step size and the scaling factor.

According to one or more embodiments of the present disclosure, the fourth obtaining code is configured to cause the at least one processor to obtain the scaling factor by: obtaining an index that indicates the scaling factor from among a plurality of scaling factors stored within a look-up table; and obtaining the scaling factor based on the index and the look-up table.

According to one or more embodiments of the present disclosure, the fourth obtaining code is configured to cause the at least one processor to obtain the scaling factor by deriving the scaling factor based on a magnitude of a translation motion vector of the current block.

According to one or more embodiments of the present disclosure, the fourth obtaining code is configured to cause the at least one processor to obtain the scaling factor by deriving the scaling factor based on shear parameters that indicate shear motion.

According to embodiments of the present disclosure, a non-transitory computer-readable medium storing computer code is provided. The computer code is configured to, when executed by at least one processor, cause the at least one processor to implement a decoder that: receives a bitstream that includes a coded picture; obtains warp information that is signaled in the bitstream, the warp information including a warp type indicating a number of parameters to be corrected by delta values, the number of parameters defining warp motion for predicting a current block of the coded picture; obtains at least one delta value from the bitstream that is a delta of at least one parameter that defines the warp motion for predicting the current block; obtains a warp model based on the warp information and the at least one delta value; and predicts the current block by performing warped motion compensation using the warp model.

BRIEF DESCRIPTION OF THE DRAWINGS

Further features, the nature, and various advantages of the disclosed subject matter will be more apparent from the following detailed description and the accompanying drawings in which:

FIG. 14 is a diagram of a computer system suitable for implementing embodiments of the present disclosure.

DETAILED DESCRIPTION

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, software, or a combination of hardware and software. The actual specialized control hardware or software code used to implement these systems and/or methods is not limiting of the implementations. It is understood that software and hardware may be designed to implement the systems and/or methods based on the description herein.

The features described below may be used separately or combined in any order. Further, the embodiments may be implemented by processing circuitry (e.g., one or more processors or one or more integrated circuits). In one example, the one or more processors execute a program that is stored in a non-transitory computer-readable medium.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of A and B" or "at least one of A or B" are to be understood as including only A, only B, or both A and B.

Figure 1:
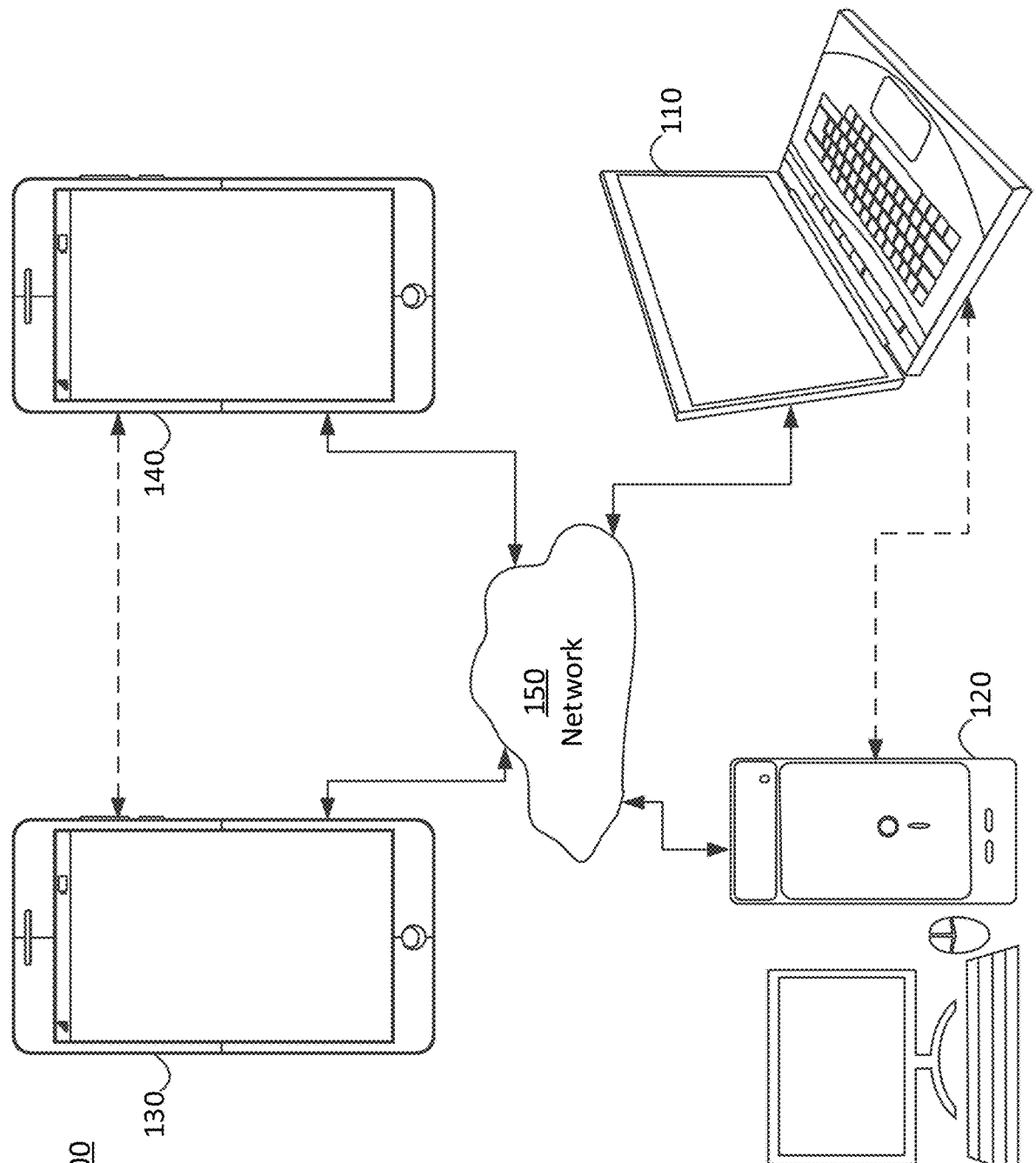
FIG. 1 is a schematic illustration of a simplified block diagram of a communication system in accordance with an embodiment.

FIG. 1 illustrates a simplified block diagram of a communication system 100 according to an embodiment of the present disclosure. The communication system 100 may include at least two terminals 110, 120 interconnected via a network 150. For unidirectional transmission of data, a first terminal 110 may code video data at a local location for transmission to the other terminal 120 via the network 150. The second terminal 120 may receive the coded video data of the other terminal from the network 150, decode the coded data and display the recovered video data. Unidirectional data transmission may be common in media serving applications and the like.

FIG. 1 illustrates a second pair of terminals 130, 140 provided to support bidirectional transmission of coded video that may occur, for example, during videoconferencing. For bidirectional transmission of data, each terminal 130, 140 may code video data captured at a local location for transmission to the other terminal via the network 150. Each terminal 130, 140 also may receive the coded video data transmitted by the other terminal, may decode the coded data, and may display the recovered video data at a local display device.

In FIG. 1, the terminals 110-140 may be illustrated as servers, personal computers, and smart phones, and/or any other type of terminal. For example, the terminals 110-140 may be laptop computers, tablet computers, media players and/or dedicated video conferencing equipment. The network 150 represents any number of networks that convey coded video data among the terminals 110-140, including for example wireline and/or wireless communication networks. The communication network 150 may exchange data in circuit-switched and/or packet-switched channels. Representative networks include telecommunications networks, local area networks, wide area networks, and/or the Internet. For the purposes of the present discussion, the architecture and topology of the network 150 may be immaterial to the operation of the present disclosure unless explained herein below.

Figure 2:
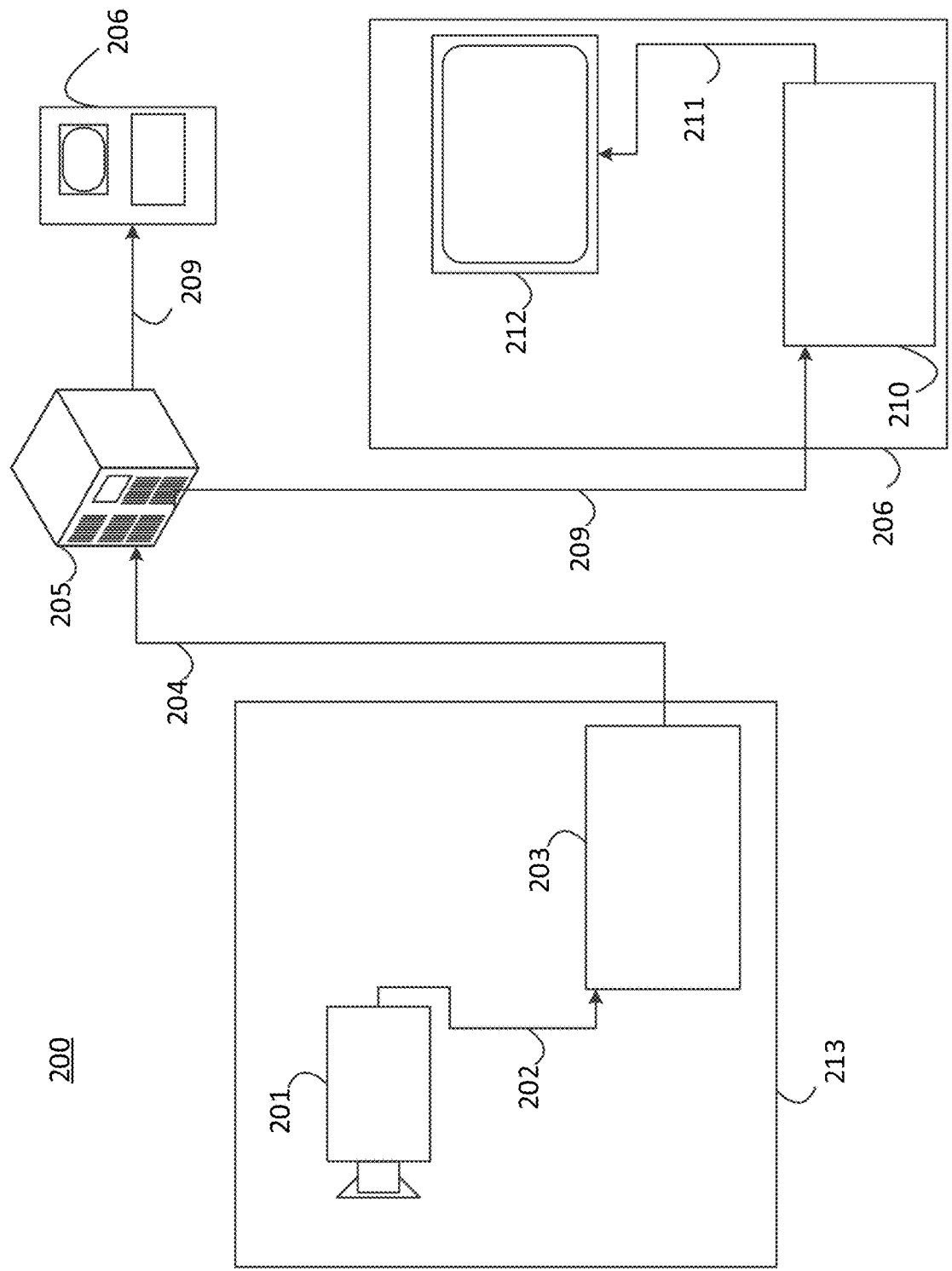
FIG. 2 is a schematic illustration of a simplified block diagram of a communication system in accordance with an embodiment.

FIG. 2 illustrates, as an example for an application for the disclosed subject matter, the placement of a video encoder and decoder in a streaming environment. The disclosed subject matter can be equally applicable to other video enabled applications, including, for example, video conferencing, digital TV, storing of compressed video on digital media including CD, DVD, memory stick and the like, and so on.

As illustrated in FIG. 2, a streaming system 200 may include a capture subsystem 213 that can include a video source 201 and an encoder 203. The video source 201 may be, for example, a digital camera, and may be configured to create an uncompressed video sample stream 202. The uncompressed video sample stream 202 may provide a high data volume when compared to encoded video bitstreams, and can be processed by the encoder 203 coupled to the video source 201. The encoder 203 can include hardware, software, or a combination thereof to enable or implement aspects of the disclosed subject matter as described in more detail below. The encoded video bitstream 204 may include a lower data volume when compared to the sample stream, and can be stored on a streaming server 205 for future use. One or more streaming clients 206 can access the streaming server 205 to retrieve video bitstreams 209 that may be copies of the encoded video bitstream 204.

In embodiments, the streaming server 205 may also function as a Media-Aware Network Element (MANE). For example, the streaming server 205 may be configured to prune the encoded video bitstream 204 for tailoring potentially different bitstreams to one or more of the streaming clients 206. In embodiments, a MANE may be separately provided from the streaming server 205 in the streaming system 200.

The streaming clients 206 can include a video decoder 210 and a display 212. The video decoder 210 can, for example, decode video bitstream 209, which is an incoming copy of the encoded video bitstream 204, and create an outgoing video sample stream 211 that can be rendered on the display 212 or another rendering device (not depicted). In some streaming systems, the video bitstreams 204, 209 can be encoded according to certain video coding/compression standards. Examples of such standards include, but are not limited to, ITU-T Recommendation H.265. Under development is a video coding standard informally known as Versatile Video Coding (VVC). Embodiments of the disclosure may be used in the context of VVC.

Figure 3:
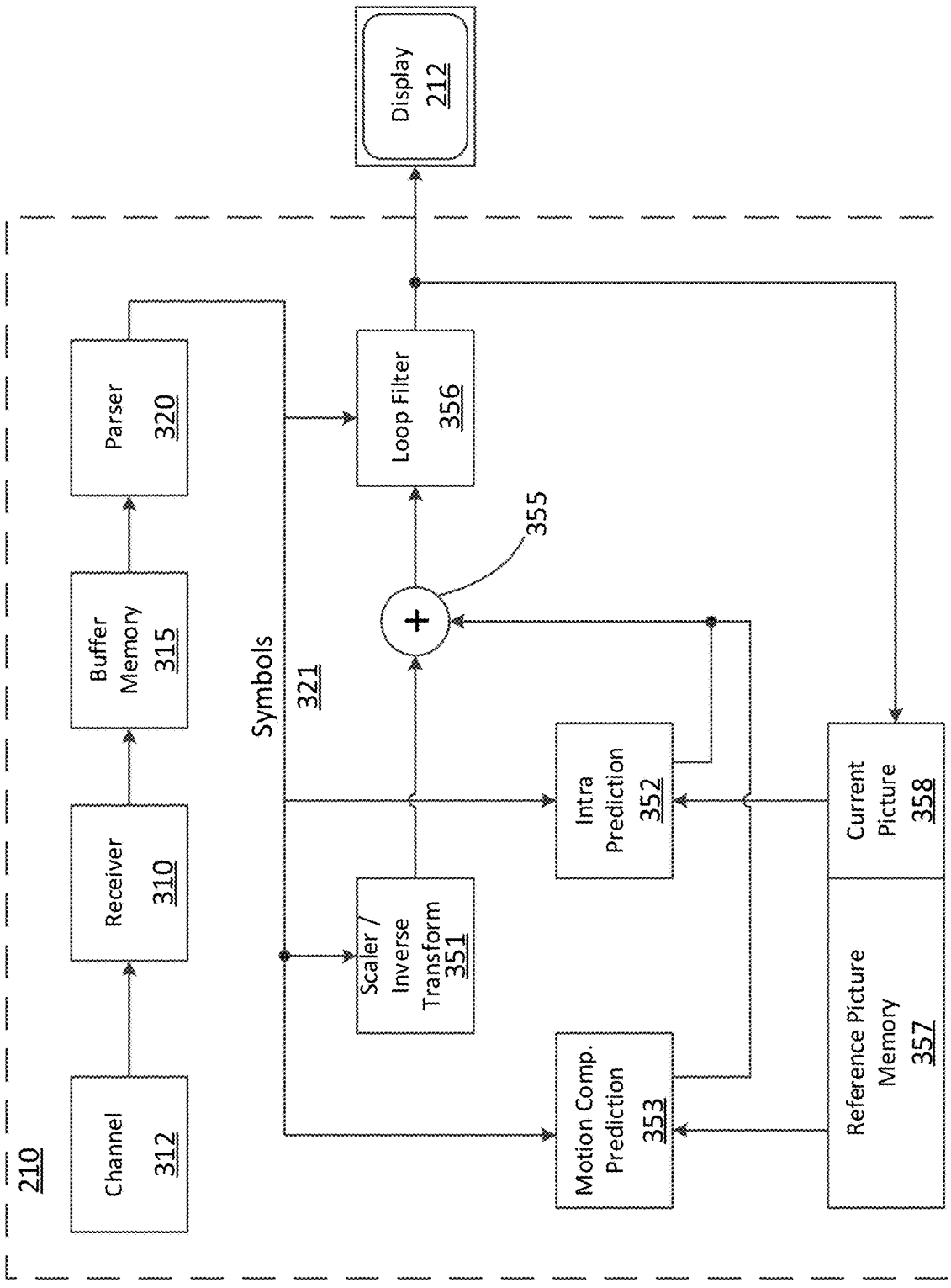
FIG. 3 is a schematic illustration of a simplified block diagram of a decoder in accordance with an embodiment.

FIG. 3 illustrates an example functional block diagram of a video decoder 210 that is attached to a display 212 according to an embodiment of the present disclosure.

The video decoder 210 may include a channel 312, receiver 310, a buffer memory 315, an entropy decoder/parser 320, a scaler/inverse transform unit 351, an intra picture prediction unit 352, a Motion Compensation Prediction unit 353, an aggregator 355, a loop filter unit 356, reference picture memory 357, and current picture memory. In at least one embodiment, the video decoder 210 may include an integrated circuit, a series of integrated circuits, and/or other electronic circuitry. The video decoder 210 may also be partially or entirely embodied in software running on one or more CPUs with associated memories.

In this embodiment, and other embodiments, the receiver 310 may receive one or more coded video sequences to be decoded by the decoder 210 one coded video sequence at a time, where the decoding of each coded video sequence is independent from other coded video sequences. The coded video sequence may be received from the channel 312, which may be a hardware/software link to a storage device which stores the encoded video data. The receiver 310 may receive the encoded video data with other data, for example, coded audio data and/or ancillary data streams, that may be forwarded to their respective using entities (not depicted). The receiver 310 may separate the coded video sequence from the other data. To combat network jitter, the buffer memory 315 may be coupled in between the receiver 310 and the entropy decoder/parser 320 ("parser" henceforth). When the receiver 310 is receiving data from a store/forward device of sufficient bandwidth and controllability, or from an isosynchronous network, the buffer memory 315 may not be used, or can be small. For use on best effort packet networks such as the Internet, the buffer memory 315 may be required, can be comparatively large, and can be of adaptive size.

The video decoder 210 may include a parser 320 to reconstruct symbols 321 from the entropy coded video sequence. Categories of those symbols include, for example, information used to manage operation of the decoder 210, and potentially information to control a rendering device such as a display 212 that may be coupled to a decoder as illustrated in FIG. 2. The control information for the rendering device(s) may be in the form of, for example, Supplementary Enhancement Information (SEI) messages or Video Usability Information (VUI) parameter set fragments (not depicted). The parser 320 may parse/entropy-decode the coded video sequence received. The coding of the coded video sequence can be in accordance with a video coding technology or standard, and can follow principles well known to a person skilled in the art, including variable length coding, Huffman coding, arithmetic coding with or without context sensitivity, and so forth. The parser 320 may extract from the coded video sequence, a set of subgroup parameters for at least one of the subgroups of pixels in the video decoder, based upon at least one parameters corresponding to the group. Subgroups can include Groups of Pictures (GOPs), pictures, tiles, slices, macroblocks, Coding Units (CUs), blocks, Transform Units (TUs), Prediction Units (PUs) and so forth. The parser 320 may also extract from the coded video sequence information such as transform coefficients, quantizer parameter values, motion vectors, and so forth.

The parser 320 may perform entropy decoding/parsing operation on the video sequence received from the buffer memory 315, so to create symbols 321.

Reconstruction of the symbols 321 can involve multiple different units depending on the type of the coded video picture or parts thereof (such as: inter and intra picture, inter and intra block), and other factors. Which units are involved, and how they are involved, can be controlled by the subgroup control information that was parsed from the coded video sequence by the parser 320. The flow of such subgroup control information between the parser 320 and the multiple units below is not depicted for clarity.

Beyond the functional blocks already mentioned, decoder 210 can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

One unit may be the scaler/inverse transform unit 351. The scaler/inverse transform unit 351 may receive quantized transform coefficient as well as control information, including which transform to use, block size, quantization factor, quantization scaling matrices, etc. as symbol(s) 321 from the parser 320. The scaler/inverse transform unit 351 can output blocks including sample values that can be input into the aggregator 355.

In some cases, the output samples of the scaler/inverse transform unit 351 can pertain to an intra coded block; that is: a block that is not using predictive information from previously reconstructed pictures, but can use predictive information from previously reconstructed parts of the current picture. Such predictive information can be provided by an intra picture prediction unit 352. In some cases, the intra picture prediction unit 352 generates a block of the same size and shape of the block under reconstruction, using surrounding already reconstructed information fetched from the current (partly reconstructed) picture from the current picture memory 358. The aggregator 355, in some cases, adds, on a per sample basis, the prediction information the intra picture prediction unit 352 has generated to the output sample information as provided by the scaler/inverse transform unit 351.

In other cases, the output samples of the scaler/inverse transform unit 351 can pertain to an inter coded, and potentially motion compensated block. In such a case, a Motion Compensation Prediction unit 353 can access reference picture memory 357 to fetch samples used for prediction. After motion compensating the fetched samples in accordance with the symbols 321 pertaining to the block, these samples can be added by the aggregator 355 to the output of the scaler/inverse transform unit 351 (in this case called the residual samples or residual signal) so to generate output sample information. The addresses within the reference picture memory 357, from which the Motion Compensation Prediction unit 353 fetches prediction samples, can be controlled by motion vectors. The motion vectors may be available to the Motion Compensation Prediction unit 353 in the form of symbols 321 that can have, for example, X, Y, and reference picture components. Motion compensation also can include interpolation of sample values as fetched from the reference picture memory 357 when sub-sample exact motion vectors are in use, motion vector prediction mechanisms, and so forth.

The output samples of the aggregator 355 can be subject to various loop filtering techniques in the loop filter unit 356. Video compression technologies can include in-loop filter technologies that are controlled by parameters included in the coded video bitstream and made available to the loop filter unit 356 as symbols 321 from the parser 320, but can also be responsive to meta-information obtained during the decoding of previous (in decoding order) parts of the coded picture or coded video sequence, as well as responsive to previously reconstructed and loop-filtered sample values.

The output of the loop filter unit 356 can be a sample stream that can be output to a render device such as a display 212, as well as stored in the reference picture memory 357 for use in future inter-picture prediction.

Certain coded pictures, once fully reconstructed, can be used as reference pictures for future prediction. Once a coded picture is fully reconstructed and the coded picture has been identified as a reference picture (by, for example, parser 320), the current reference picture can become part of the reference picture memory 357, and a fresh current picture memory can be reallocated before commencing the reconstruction of the following coded picture.

The video decoder 210 may perform decoding operations according to a predetermined video compression technology that may be documented in a standard, such as ITU-T Rec. H.265. The coded video sequence may conform to a syntax specified by the video compression technology or standard being used, in the sense that it adheres to the syntax of the video compression technology or standard, as specified in the video compression technology document or standard and specifically in the profiles document therein. Also, for compliance with some video compression technologies or standards, the complexity of the coded video sequence may be within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver 310 may receive additional (redundant) data with the encoded video. The additional data may be included as part of the coded video sequence(s). The additional data may be used by the video decoder 210 to properly decode the data and/or to more accurately reconstruct the original video data. Additional data can be in the form of, for example, temporal, spatial, or SNR enhancement layers, redundant slices, redundant pictures, forward error correction codes, and so on.

Figure 4:
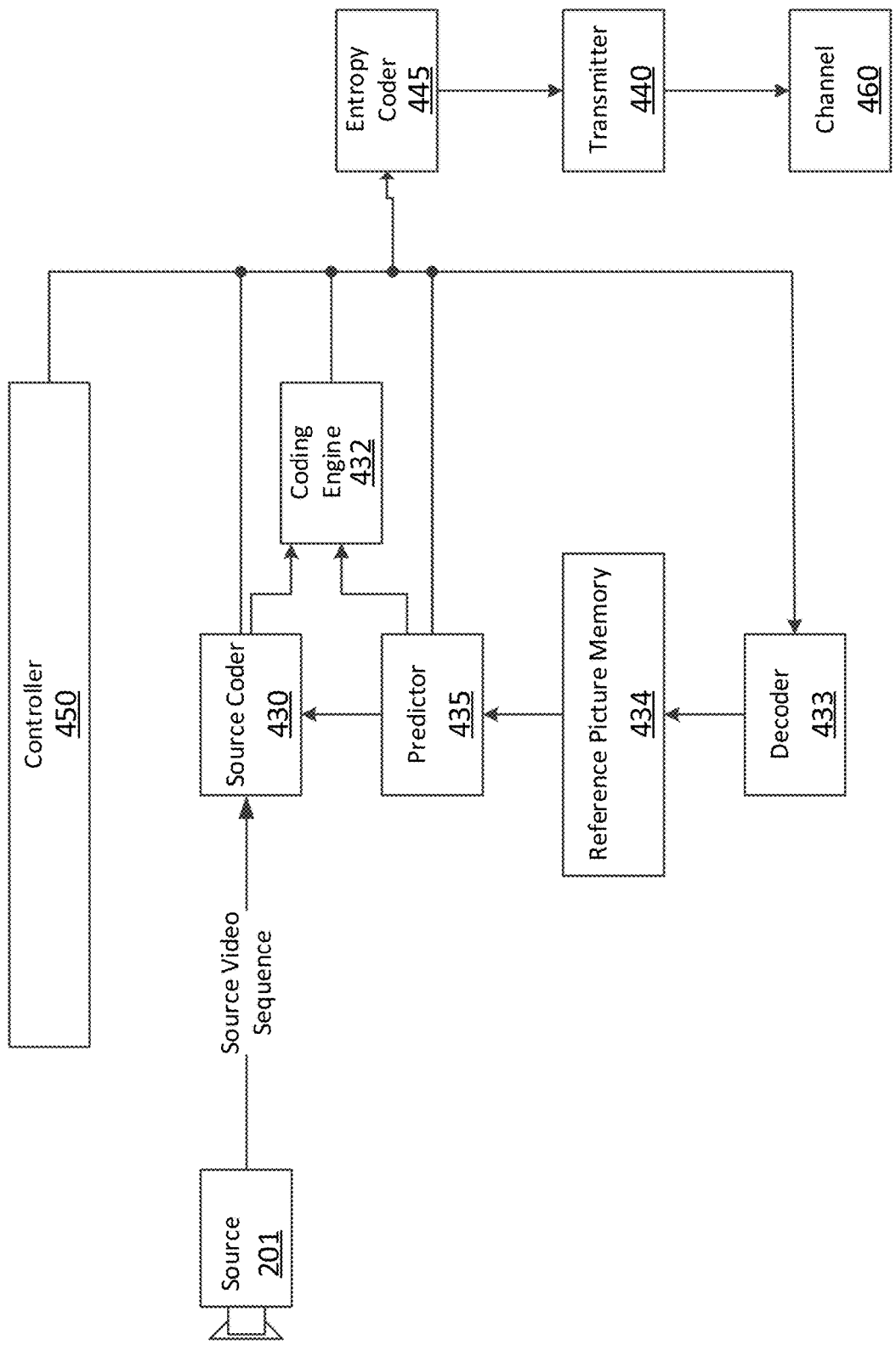
FIG. 4 is a schematic illustration of a simplified block diagram of an encoder in accordance with an embodiment.

FIG. 4 illustrates an example functional block diagram of a video encoder 203 associated with a video source 201 according to an embodiment of the present disclosure.

The video encoder 203 may include, for example, an encoder that is a source coder 430, a coding engine 432, a (local) decoder 433, a reference picture memory 43, a predictor 435, a transmitter 440, an entropy coder 445, a controller 450, and a channel 460.

The encoder 203 may receive video samples from a video source 201 (that is not part of the encoder) that may capture video image(s) to be coded by the encoder 203.

The video source 201 may provide the source video sequence to be coded by the encoder 203 in the form of a digital video sample stream that can be of any suitable bit depth (for example: 8 bit, 10 bit, 12 bit, ... ), any colorspace (for example, BT.601 Y CrCB, RGB, ... ) and any suitable sampling structure (for example Y CrCb 4:2:0, Y CrCb 4:4:4). In a media serving system, the video source 201 may be a storage device storing previously prepared video. In a videoconferencing system, the video source 201 may be a camera that captures local image information as a video sequence. Video data may be provided as a plurality of individual pictures that impart motion when viewed in sequence. The pictures themselves may be organized as a spatial array of pixels, wherein each pixel can include one or more sample depending on the sampling structure, color space, etc. in use. A person skilled in the art can readily understand the relationship between pixels and samples. The description below focuses on samples.

According to an embodiment, the encoder 203 may code and compress the pictures of the source video sequence into a coded video sequence 443 in real time or under any other time constraints as required by the application. Enforcing appropriate coding speed is one function of controller 450. The controller 450 may also control other functional units as described below and may be functionally coupled to these units. The coupling is not depicted for clarity. Parameters set by the controller 450 can include rate control related parameters (picture skip, quantizer, lambda value of rate-distortion optimization techniques, ... ), picture size, group of pictures (GOP) layout, maximum motion vector search range, and so forth. A person skilled in the art can readily identify other functions of controller 450 as they may pertain to video encoder 203 optimized for a certain system design.

Some video encoders operate in what a person skilled in the are readily recognizes as a "coding loop". As an oversimplified description, a coding loop can consist of the encoding part of the source coder 430 (responsible for creating symbols based on an input picture to be coded, and a reference picture(s)), and the (local) decoder 433 embedded in the encoder 203 that reconstructs the symbols to create the sample data that a (remote) decoder also would create when a compression between symbols and coded video bitstream is lossless in certain video compression technologies. That reconstructed sample stream may be input to the reference picture memory 434. As the decoding of a symbol stream leads to bit-exact results independent of decoder location (local or remote), the reference picture memory content is also bit exact between a local encoder and a remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is known to a person skilled in the art.

The operation of the "local" decoder 433 can be the same as of a "remote" decoder 210, which has already been described in detail above in conjunction with FIG. 3. However, as symbols are available and en/decoding of symbols to a coded video sequence by the entropy coder 445 and the parser 320 can be lossless, the entropy decoding parts of decoder 210, including channel 312, receiver 310, buffer memory 315, and parser 320 may not be fully implemented in the local decoder 433.

An observation that can be made at this point is that any decoder technology, except the parsing/entropy decoding that is present in a decoder, may need to be present, in substantially identical functional form in a corresponding encoder. For this reason, the disclosed subject matter focuses on decoder operation. The description of encoder technologies can be abbreviated as they may be the inverse of the comprehensively described decoder technologies. Only in certain areas a more detail description is required and provided below.

As part of its operation, the source coder 430 may perform motion compensated predictive coding, which codes an input frame predictively with reference to one or more previously-coded frames from the video sequence that were designated as "reference frames." In this manner, the coding engine 432 codes differences between pixel blocks of an input frame and pixel blocks of reference frame(s) that may be selected as prediction reference(s) to the input frame.

The local decoder 433 may decode coded video data of frames that may be designated as reference frames, based on symbols created by the source coder 430. Operations of the coding engine 432 may advantageously be lossy processes. When the coded video data may be decoded at a video decoder (not shown in FIG. 4), the reconstructed video sequence typically may be a replica of the source video sequence with some errors. The local decoder 433 replicates decoding processes that may be performed by the video decoder on reference frames and may cause reconstructed reference frames to be stored in the reference picture memory 434. In this manner, the encoder 203 may store copies of reconstructed reference frames locally that have common content as the reconstructed reference frames that will be obtained by a far-end video decoder (absent transmission errors).

The predictor 435 may perform prediction searches for the coding engine 432. That is, for a new frame to be coded, the predictor 435 may search the reference picture memory 434 for sample data (as candidate reference pixel blocks) or certain metadata such as reference picture motion vectors, block shapes, and so on, that may serve as an appropriate prediction reference for the new pictures. The predictor 435 may operate on a sample block-by-pixel block basis to find appropriate prediction references. In some cases, as determined by search results obtained by the predictor 435, an input picture may have prediction references drawn from multiple reference pictures stored in the reference picture memory 434.

The controller 450 may manage coding operations of the source coder 430, including, for example, setting of parameters and subgroup parameters used for encoding the video data.

Output of all aforementioned functional units may be subjected to entropy coding in the entropy coder 445. The entropy coder translates the symbols as generated by the various functional units into a coded video sequence, by loss-less compressing the symbols according to technologies known to a person skilled in the art as, for example Huffman coding, variable length coding, arithmetic coding, and so forth.

The transmitter 440 may buffer the coded video sequence(s) as created by the entropy coder 445 to prepare it for transmission via a communication channel 460, which may be a hardware/software link to a storage device which would store the encoded video data. The transmitter 440 may merge coded video data from the source coder 430 with other data to be transmitted, for example, coded audio data and/or ancillary data streams (sources not shown).

The controller 450 may manage operation of the encoder 203. During coding, the controller 450 may assign to each coded picture a certain coded picture type, which may affect the coding techniques that may be applied to the respective picture. For example, pictures often may be assigned as an Intra Picture (I picture), a Predictive Picture (P picture), or a Bi-directionally Predictive Picture (B Picture).

An Intra Picture (I picture) may be one that may be coded and decoded without using any other frame in the sequence as a source of prediction. Some video codecs allow for different types of Intra pictures, including, for example Independent Decoder Refresh (IDR) Pictures. A person skilled in the art is aware of those variants of I pictures and their respective applications and features.

A Predictive picture (P picture) may be one that may be coded and decoded using intra prediction or inter prediction using at most one motion vector and reference index to predict the sample values of each block.

A Bi-directionally Predictive Picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

The video encoder 203 may perform coding operations according to a predetermined video coding technology or standard, such as ITU-T Rec. H.265. In its operation, the video encoder 203 may perform various compression operations, including predictive coding operations that exploit temporal and spatial redundancies in the input video sequence. The coded video data, therefore, may conform to a syntax specified by the video coding technology or standard being used.

In an embodiment, the transmitter 440 may transmit additional data with the encoded video. The source coder 430 may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and so on.

[Block Partitioning in VP9 and AV1]

Figure 5A:
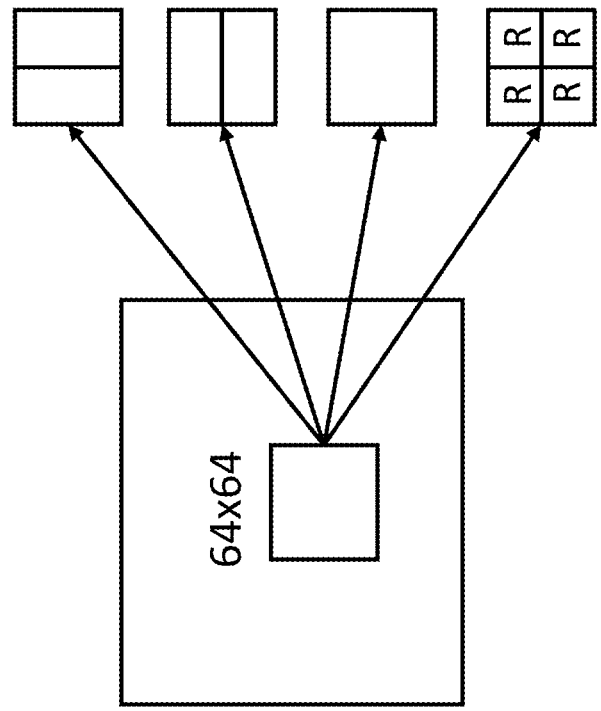
FIG. 5A is a schematic illustration of a partition tree in VP9, in accordance with an embodiment.

As previously described, AV1 is an open video coding format designed for video transmissions over the Internet developed as a successor to VP9. With reference to FIG. 5A, VP9 uses a 4-way partition tree starting from a 64×64 level down to a 4×4 level, with some additional restrictions for blocks 8×8 and below (as shown in the top half of FIG. 5A). The partitions designated as R may be referred to as recursive in that the same partition tree may be repeated at a lower scale until the partitions reach the lowest 4×4 level.

Figure 5B:
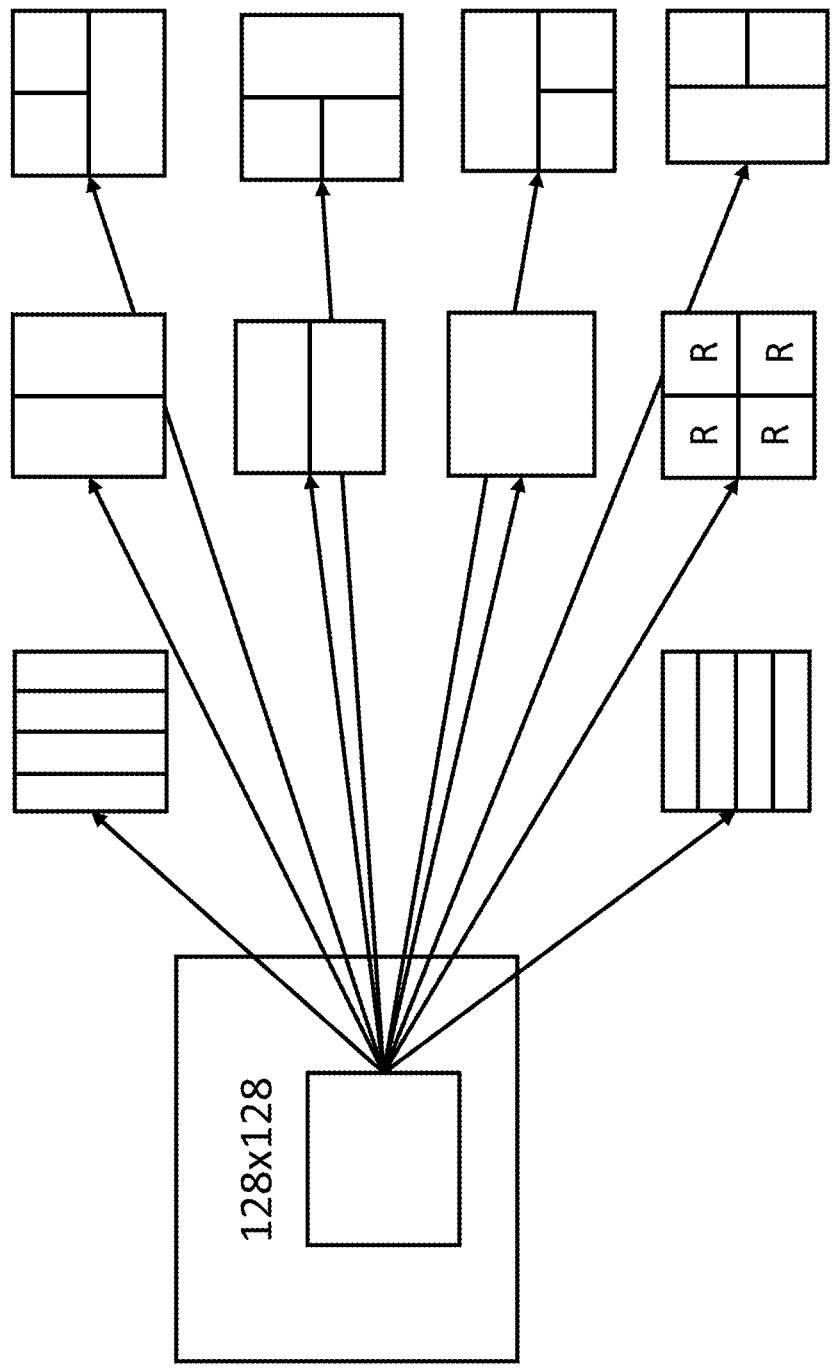
FIG. 5B is a schematic illustration of a partition tree in AV1, in accordance with an embodiment.

With reference to FIG. 5B, AV1 not only expands the partition-tree to a 10-way structure, but also increases the largest size (referred to as superblock in VP9/AV1 parlance) to start from 128×128. This may include 4:1/1:4 rectangular partitions that did not exist in VP9. None of the rectangular partitions may be further subdivided. In addition, AV1 adds more flexibility to the use of partitions below the 8×8 level, in the sense that the 2×2 chroma inter prediction now becomes possible in certain cases.

[Block Partitioning in HEVC]

In HEVC, a coding tree unit (CTU) may be split into coding units (CUs) by using a quad-tree (QT) structure denoted as coding tree to adapt to various local characteristics. The decision on whether to code a picture area using inter-picture (temporal) or intra-picture (spatial) prediction may be made at the CU level. Each CU can be further split into one, two or four prediction units (PUs) according to the PU splitting type. Inside one PU, the same prediction process may be applied and the relevant information may be transmitted to the decoder on a PU basis. After obtaining the residual block by applying the prediction process based on the PU splitting type, a CU can be partitioned into transform units (TUs) according to another QT structure like the coding tree for the CU. One of key features of the HEVC structure is that it has the multiple partition conceptions including CU, PU, and TU. In HEVC, a CU or a TU can only be square shape, while a PU may be square or rectangular shape for an inter predicted block. In HEVC, one coding block may be further split into four square sub-blocks, and transform is performed on each sub-block, i.e., TU. Each TU may be further split recursively (using QT split) into smaller TUs, which is called Residual Quad-Tree (RQT).

At picture boundaries, HEVC employs implicit quad-tree split so that a block will keep quad-tree splitting until the size fits the picture boundary.

[Block Partitioning in VVC]

1. Block Partitioning Structure Using Quad-Tree (QT) Plus Binary Tree (BT)

Figure 6B:
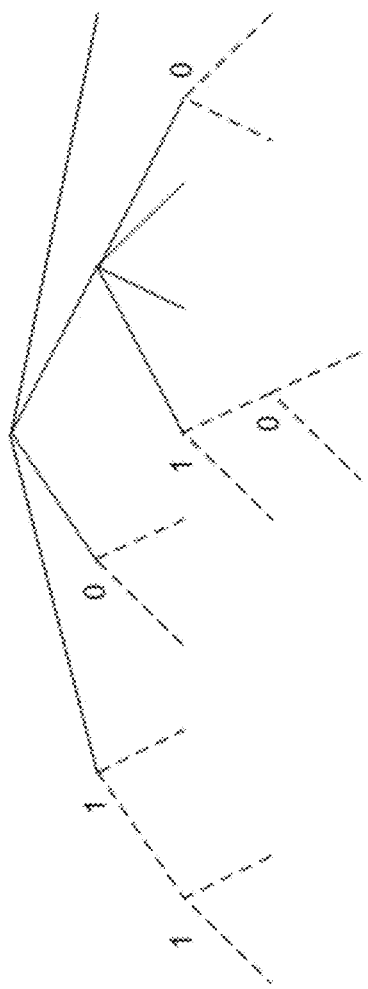
FIG. 6B is a schematic illustration of a corresponding tree representation of the block partitioned QTBT structure shown in FIG. 6A.
Figure 6A:
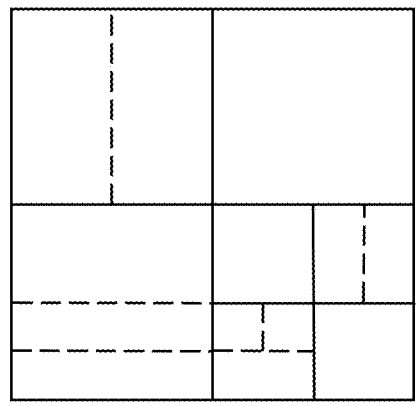
FIG. 6A is a schematic illustration of a block partitioning of a quad-tree plus binary tree (QTBT) structure, in accordance with an embodiment.

The QTBT block structure removes the concepts of multiple partition types. That is, the QTBT block structure removes the separation of the CU, PU and TU concepts, and supports more flexibility for CU partition shapes. In the QTBT block structure, a CU may have a square or a rectangular shape. With reference to FIGS. 6A-B, a coding tree unit (CTU) is first partitioned by a quadtree structure. The quadtree leaf nodes are further partitioned by a binary tree structure. There are two splitting types, symmetric horizontal splitting and symmetric vertical splitting, in the BT splitting. The BT leaf nodes may be called the CUs, and that segmentation is used for prediction and transform processing without any further partitioning. This means that the CU, PU and TU have the same block size in a QTBT coding block structure. In the joint exploration model (JEM), a CU may consist of coding blocks (CBs) of different color components. For example, one CU may contain one luma CB and two chroma CBs in the case of prediction (P) and binary (B) slices of the 4:2:0 chroma format. A CU may also include or consist of a CB of a single component. For example, one CU may contain only one luma CB or just two chroma CBs in the case of I slices.

The following parameters may be defined for the QTBT partitioning scheme:
  (a) CTU size: the root node size of a quadtree, which may be the same concept as in HEVC.
  (b) MinQTSize: the minimum allowed quadtree leaf node size.
  (c) MaxBTSize: the maximum allowed binary tree root node size.
  (d) MaxBTDepth: the maximum allowed binary tree depth.
  (e) MinBTSize: the minimum allowed binary tree leaf node size.

In one example of the QTBT partitioning structure, the CTU size may be set as 128×128 luma samples with two corresponding 64×64 blocks of chroma samples, the MinQTSize may be set as 16×16, the MaxBTSize may be set as 64×64, the MinBTSize (for both width and height) may be set as 4×4, and the MaxBTDepth may be set as 4. The quadtree partitioning may be applied to the CTU first to generate QT leaf nodes. The QT leaf nodes may have a size from 16×16 (i.e., the MinQTSize) to 128×128 (i.e., the CTU size). If the leaf QT node is 128×128, it may not be further split by the binary tree since the size exceeds the MaxBTSize (i.e., 64×64). Otherwise, the leaf QT node may not be further partitioned by the binary tree. Therefore, the QT leaf node is also the root node for the BT and it has a BT depth of zero. When the BT depth reaches MaxBTDepth (i.e., 4), no further splitting may be considered. When the BT node has width equal to MinBTSize (i.e., 4), no further horizontal splitting may be considered. Similarly, when the BT node has a height equal to MinBTSize, no further vertical splitting may be considered. The leaf nodes of the BT may be further processed by prediction and transform processing without any further partitioning. In the JEM, for example, the maximum CTU size may be 256×256 luma samples.

FIG. 6A illustrates an example of block partitioning by using QTBT, and FIG. 6B illustrates the corresponding tree representation. The solid lines indicate QT splitting and the dotted lines indicate BT splitting. In each splitting (i.e., non-leaf) node of the BT, one flag may be signalled to indicate which splitting type (i.e., horizontal or vertical) is used, where 0 indicates horizontal splitting and 1 indicates vertical splitting. For the QT splitting, there may be no need to indicate the splitting type since QT splitting may always split a block both horizontally and vertically to produce 4 sub-blocks with an equal size.

The QTBT scheme may support flexibility for the luma and chroma to have a separate QTBT structure. Currently, for P and B slices, the luma and chroma CTBs in one CTU share the same QTBT structure. However, for I slices, the luma CTB is partitioned into CUs by a QTBT structure, and the chroma CTBs are partitioned into chroma CUs by another QTBT structure. This means that a CU in an I slice consists of a coding block of the luma component or coding blocks of two chroma components, and a CU in a P or B slice consists of coding blocks of all three color components.

In HEVC, inter prediction for small blocks is restricted to reduce the memory access of motion compensation, such that bi-prediction is not supported for 4×8 and 8×4 blocks, and inter prediction is not supported for 4×4 blocks. In the QTBT as implemented in the JEM-7.0, these restrictions are removed.

2. Block Partitioning Structure Using Ternary Tree (TT)

Figure 7B:
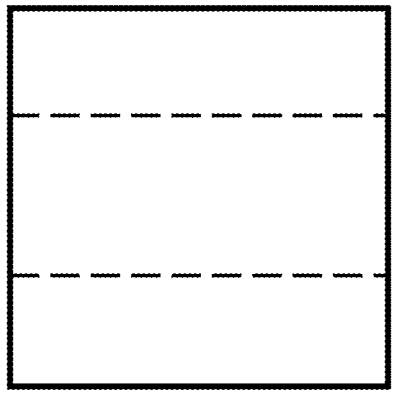
FIG. 7B is a schematic illustration of a horizontal center-side triple-tree partitioning, in accordance with an embodiment.
Figure 7A:
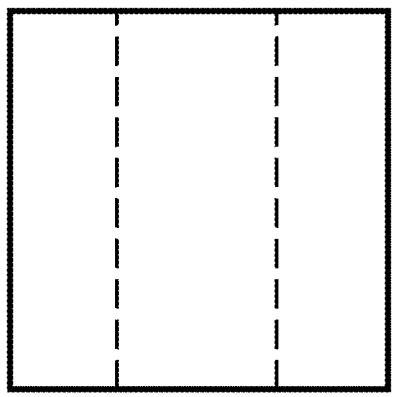
FIG. 7A is a schematic illustration of a vertical center-side triple-tree partitioning, in accordance with an embodiment.

In VVC, a multi-type-tree (MTT) structure is included, which further adds the horizontal and vertical center-side triple-trees on top of QTBT, as shown in FIGS. 7A-B. FIG. 7A illustrates a vertical center-side triple-tree partitioning, and FIG. 7B illustrates a horizontal center-side triple-tree partitioning.

Key benefits of the triple-tree partitioning include but are not limited to: (a) providing a complement to quad-tree and binary-tree partitioning, that is, triple-tree partitioning is able to capture objects which are located in the block center while the quad-tree and the binary-tree are always splitting along the block center; and (b) the width and height of the partitions of the proposed triple trees may always be a power of 2, as such no additional transforms may be needed.

The design of two-level tree is mainly motivated by complexity reduction. Theoretically, the complexity of traversing a tree is TD, where T denotes the number of split types, and D is the depth of tree.

[Merge Mode with Motion Vector Difference (MMVD)]

In merge mode, implicitly derived motion information is directly used for prediction sample generation of a current CU. The merge mode with motion vector differences (MMVD) is introduced in VVC. An MMVD flag is signalled right after sending a skip flag and merge flag to specify whether MMVD mode is used for the CU.

In MMVD, after a merge candidate is selected, it may be further refined by the signalled motion vector differences (MVDs) information. The MVDs information may include a merge candidate flag, an index to specify motion magnitude, and an index for indication of motion direction. In MMVD mode, one of the first two candidates in the merge list is selected to be used as motion vector (MV) basis. The merge candidate flag may be signalled to specify which one of the first two candidates is used.

Figure 8:
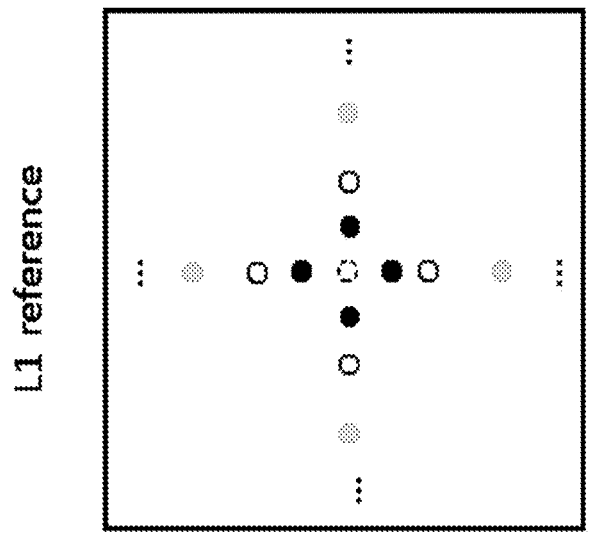
FIG. 8 is a schematic illustration of a merge mode with motion vector difference (MMVD) search point of two reference frames, in accordance with an embodiment.
Figure 8:
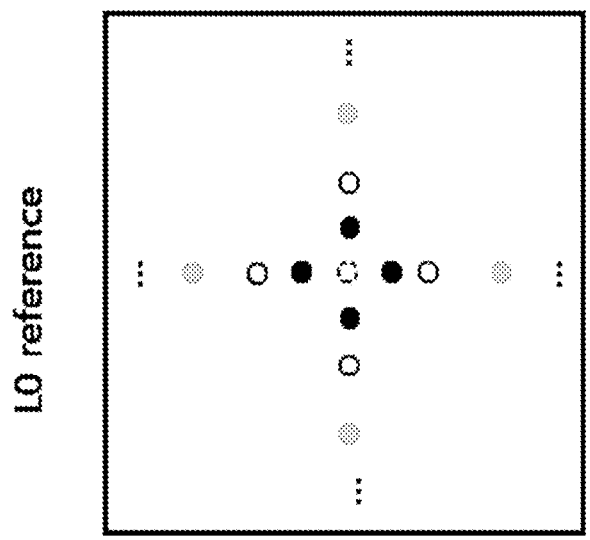

A distance index may be used and may specify the motion magnitude information and indicates a predefined offset from the starting point. FIG. 8 illustrates an MMVD search point of two reference frames, according to some embodiments. As shown in FIG. 8, an offset may be added to either horizontal components or vertical components of a starting MV. A relation between the distance index and the predefined offset is specified below in TABLE 1.

TABLE 1

Relation of distance index and predefined offset

| Distance IDX | 0 | 1 | 2 | 3 | 4 | 5 | 6 | 7 |
|---|---|---|---|---|---|---|---|---|
| Offset (in unit of luma sample) | ¼ | ½ | 1 | 2 | 4 | 8 | 16 | 32 |

A direction index may be used and may represent the direction of the MVD relative to the starting point. The direction index may represent one of the four directions, as shown below in TABLE 2. The meaning of the MVD sign may be variant according to the information of the starting MVs. When the starting MVs are a uni-prediction MVs or bi-prediction MVs with both lists pointing to the same side of the current picture (i.e., picture order counts (POCs) of two references are both larger than the POC of the current picture, or are both smaller than the POC of the current picture), the sign in TABLE 2 specifies the sign of MV offset added to the starting MV. When the starting MVs are bi-prediction MVs with the two MVs pointing to the different sides of the current picture (i.e., the POC of one reference is larger than the POC of the current picture, and the POC of the other reference is smaller than the POC of the current picture), and the difference of the POC in list 0 (L0) is greater than the one in list 1 (L1), the sign in TABLE 2 specifies the sign of MV offset added to the L0 MV component of starting MV and the sign for the L1 MV has the opposite value. Otherwise, if the difference of the POC in L1 is greater than L0, the sign in TABLE 2 specifies the sign of the MV offset added to the L1 MV component of the starting MV and the sign for the L0 MV has the opposite value.

The MVD may be scaled according to the difference of POCs in each direction. If the differences of POCs in both lists are the same, no scaling may be needed. Otherwise, if the difference of POC in L0 is larger than the one of L1, the MVD for L1 is scaled. If the POC difference of L1 is greater than L0, the MVD for L0 may be scaled in the same way. If the starting MV is uni-predicted, the MVD may be added to the available MV.

TABLE 2

Sign of MV offset specified by direction index

| Direction IDX | 00 | 01 | 10 | 11 |
|---|---|---|---|---|
| x-axis | + | − | N/A | N/A |
| y-axis | N/A | N/A | + | − |

[Symmetric MVD Coding]

In VVC, besides the normal unidirectional prediction and bi-directional prediction mode MVD signalling, symmetric MVD mode for bi-directional MVD signalling may be applied. In the symmetric MVD mode, motion information including reference picture indices of both L0 and L1 and MVD of L1 may be derived, not explicitly signaled.

The decoding process of the symmetric MVD mode may be as follows:

At slice level, variables BiDirPredFlag, RefIdxSymL0, and RefIdxSymL1 may be derived as follows: If mvd_l1_zero flag is 1, BiDirPredFlag is set equal to 0. Otherwise, if the nearest reference picture in L0 and the nearest reference picture in L1 form a forward and backward pair of reference pictures or a backward and forward pair of reference pictures, then BiDirPredFlag is set to 1, and both L0 and L1 reference pictures are short-term reference pictures. Otherwise, BiDirPredFlag is set to 0.

At the CU level, a symmetrical mode flag indicating whether symmetrical mode is used or not may be explicitly signaled if the CU is bi-prediction coded and BiDirPredFlag is equal to 1. When the symmetrical mode flag is true, only mvp_l0_flag, mvp_l1_flag and MVD0 may be explicitly signaled. The reference indices for L0 and L1 may be set equal to the pair of reference pictures, respectively. MVD1 may be set equal to (−MVD0).

[Inter Mode Coding in CWG-B018]

In AV1, for each coded block in an inter frame, if the mode of the current block is not skip mode but inter-coded mode, then another flag may be signaled to indicate whether single reference mode or compound reference mode is used for the current block. A prediction block may be generated by one motion vector in single reference mode. In compound reference mode, a prediction block may be generated by a weighted averaging of two prediction blocks derived from two motion vectors.

For a single reference case, the following modes may be signaled:

(a) NEARMV—use one of the motion vector predictors (MVP) in the list indicated by a Dynamic Reference List (DRL) index.

(b) NEWMV—use one of the MVPs in the list signaled by a DRL index as reference and apply a delta to the MVP.

(c) GLOBALMV—use a motion vector based on frame-level global motion parameters.

For a compound reference case, the following modes may be signaled:

(a) NEAR_NEARMV—use one of the MVPs in the list signaled by a DRL index.

(b) NEAR_NEWMV—use one of the MVPs in the list signaled by a DRL index as reference and send a delta MV for the second MV.

(c) NEW_NEARMV—use one of the MVPs in the list signaled by a DRL index as reference and send a delta MV for the first MV.

(d) NEW_NEWMV—use one of the MVPs in the list signaled by a DRL index as reference and send a delta MV for both MVs.

(e) GLOBAL_GLOBALMV—use MVs from each reference based on their frame-level global motion parameters.

[Motion Vector Difference Coding in AV1]

AV1 allows ⅛ pixel motion vector precision (or accuracy), and the following syntaxes may be used to signal the motion vector difference in reference frame lists L0 or L1.

According to embodiments, the syntax element mv_joint specifies which components of the motion vector difference are non-zero. A value of 0 may indicate there is no non-zero MVD along either horizontal or vertical direction. A value of 1 may indicate there is non-zero MVD only along the horizontal direction. A value of 2 may indicate there is non-zero MVD only along the vertical direction. A value of 3 may indicate there is non-zero MVD along both the horizontal and vertical direction.

According to embodiments, the syntax element mv_sign specifies whether a motion vector difference is positive or negative.

According to embodiments, the syntax element mv_class specifies the class of the motion vector difference. As shown below in TABLE 3, a higher class means that the motion vector difference has a larger magnitude.

TABLE 3

Magnitude class for motion vector difference

| MV class | Magnitude of MVD |
| --- | --- |
| MV_CLASS_0 | (0, 2] |
| MV_CLASS_1 | (2, 4] |
| MV_CLASS_2 | (4, 8] |
| MV_CLASS_3 | (8, 16] |
| MV_CLASS_4 | (16, 32] |
| MV_CLASS_5 | (32, 64] |
| MV_CLASS_6 | (64, 128] |
| MV_CLASS_7 | (128, 256] |
| MV_CLASS_8 | (256, 512] |
| MV_CLASS_9 | (512, 1024] |
| MV_CLASS_10 | (1024, 2048] |

According to embodiments, the syntax element mv_bit specifies the integer part of the offset between the motion vector difference and a starting magnitude of each MV class.

According to embodiments, the syntax element mv_fr specifies the first two fractional bits of the motion vector difference.

According to embodiments, the syntax element mv_hp specifies the third fractional bit of the motion vector difference.

[Adaptive MVD resolution in CWG-B092]

For NEW_NEARMV and NEAR_NEWMV mode, the precision of the MVD may depend on the associated class and the magnitude of MVD.

Firstly, fractional MVD may be allowed only if the MD magnitude is equal to or less than one-pixel.

Secondly, only one MVD value may be allowed when the value of the associated MV class is equal to or greater than MV_CLASS_1, and the MD value in each MV class may be derived as 4, 8, 16, 32, 64 for MV class 1 (MV_CLASS_1), MV class 2 (MV_CLASS_2), MV class 3 (MV_CLASS_3), MV class 4 (MV_CLASS_4), or MV class 5 (MV_CLASS_5).

The allowed MVD values in each MV class are shown below in TABLE 4.

TABLE 4

Adaptive MVD in each MV magnitude class

| MV class | Magnitude of MVD |
| --- | --- |
| MV_CLASS_0 | (0, 1], {2} |
| MV_CLASS_1 | {4} |
| MV_CLASS_2 | {8} |
| MV_CLASS_3 | {16} |
| MV_CLASS_4 | {32} |
| MV_CLASS_5 | {64} |
| MV_CLASS_6 | {128} |
| MV_CLASS_7 | {256} |
| MV_CLASS_8 | {512} |
| MV_CLASS_9 | {1024} |
| MV_CLASS_10 | {2048} |

In some embodiments, if the current block is coded using NEW_NEARMV or NEAR_NEWMV mode, one context may be used for signaling mv_joint or mv_class. If the current block is not coded using NEW_NEARMV or NEAR_NEWMV mode, another context may be used for signaling mv_joint or mv_class.

[Joint MVD coding (JMVD) in CWG-B092]

A new inter coded mode, named as JOINT_NEWMV, may be applied to indicate whether the MVDs for two reference lists are jointly signaled. If the inter prediction mode is equal to JOINT_NEWMV mode, the MVDs for reference lists L0 and L1 are jointly signaled. As such, only one MVD, named as joint_mvd, may be signaled and transmitted to a decoder, and the delta MVs for reference lists L0 and L1 may be derived from joint_mvd.

JOINT_NEWMV mode may be signaled together with NEAR_NEARMV, NEAR_NEWMV, NEW_NEARMV, NEW_NEWMV, and GLOBAL_GLOBALMV mode. No additional contexts may be added.

When JOINT_NEWMV mode is signaled, and the POC distance between two reference frames and a current frame is different, MVD may be scaled for reference list L0 or reference list L1 based on the POC distance. To be specific, the distance between reference frame list L0 and current frame is noted as td0 and the distance between reference frame list L1 and current frame is noted as td1. If td0 is equal to or larger than td1, then joint_mvd may be directly used for reference list L0 and the mvd for reference list L1 may be derived from joint_mvd based on the following EQUATION 1.

$$\text{derived\_mvd} = \frac{td1}{td0} * \text{joint\_mvd} \qquad \text{(EQUATION 1)}$$

Otherwise, if td1 is equal to or larger than td0, joint_mvd may be directly used for reference list L1 and the mvd for reference list L0 may be derived from joint_mvd based on the following EQUATION 2.

$$\text{derived\_mvd} = \frac{td0}{td1} * \text{joint\_mvd} \qquad \text{(EQUATION 2)}$$

[Improvement for Adaptive MVD Resolution in CWG-C011]

A new inter coded mode, named as AMVDMV, may be added to the single reference case. When AMVDMV mode is selected, it may indicate that AMVD is applied to the signal MVD.

One flag, named as amvd_flag, may be added under JOINT_NEWMV mode to indicate whether AMVD is applied to joint MVD coding mode or not. When adaptive MVD resolution is applied to joint MVD coding mode, named as joint AMVD coding, MVD for two reference frames may be jointly signaled and the precision of MVD may be implicitly determined by MVD magnitudes. Otherwise, MVD for two (or more than two) reference frames are jointly signaled, and conventional MVD coding is applied.

[Adaptive Motion Vector Resolution (AMVR) in CWG-C012 and CWG-C020]

The AMVR was initially proposed in CWG-C012 where a total of seven MV precisions (i.e., 8, 4, 2, 1, ½, ¼, ⅛) are supported. For each prediction block, an AVM encoder searches all the supported precision values and signals the best precision to the decoder.

To reduce the encoder run-time, two precision sets may be supported. Each precision set may contain four predefined precisions. The precision set may be adaptively selected at the frame level based on the value of maximum precision of the frame. Similar to AV1, the maximum precision may be signaled in the frame header. The below TABLE 5 summarizes the supported precision values based on the frame level maximum precision.

TABLE 5

Supported MV precisions in two sets

| Frame level maximum precision | Supported MV precisions |
| --- | --- |
| 1/8 | 1/8, 1/2, 1, 4 |
| 1/4 | 1/4, 1, 4, 8 |

In AVM software (similar to AV1), there may be a frame level flag to indicate if the MVs of the frame contain sub-pel precisions or not. The AMVR may be enabled only if the value of cur_frame_force_integer_mv flag is 0. In the AMVR, if precision of the block is lower than the maximum precision, motion model and interpolation filters may not be signaled. If the precision of a block is lower than the maximum precision, motion mode may be inferred to translation motion and an interpolation filter may be inferred to be a REGULAR interpolation filter. Similarly, if the precision of the block is either 4-pel or 8-pel, inter-intra mode may not be signaled and may be inferred to be 0.

[Warped Motion Mode in AV1]

Motion compensation typically assumes a translational motion model between the reference and target block. However, warped motion utilizes an affine model.

The affine motion model can be represented by the below EQUATION 3:

$$\begin{bmatrix} x' \\ y' \end{bmatrix} = \begin{bmatrix} a_1 & a_2 & a_3 \\ b_1 & b_2 & b_3 \end{bmatrix} \cdot \begin{bmatrix} x \\ y \\ 1 \end{bmatrix}$$ (EQUATION 3)

where [x, y] are coordinates of the original pixel and [x', y'] are the warped coordinates of the reference block. It can be seen from EQUATION 3 that up to six parameters may be used to specify the warped motion: $a_3$ and $b_3$ specify a translational MV; $a_1$ and $b_2$ specify the scaling along the MV; and $a_2$ and $b_1$ specify the rotation.

1. Global Warped Motion Compensation

In global warped motion compensation, global motion information may be signaled for each inter reference frame, which includes a global motion type and several motion parameters. The global motion types and numbers of associated parameters are listed below in TABLE 6.

TABLE 6

Global motion types with associated number of parameters

| Global motion type | Number of parameters |
| --- | --- |
| Identity (zero motion) | 0 |
| Translational | 2 |
| Rotational | 4 |
| Zoom | 4 |
| General affine | 6 |

After signaling the reference frame index, if global motion is selected, the global motion type and the parameters associated with the given reference frame may be used for the current coding block.

2. Local Warped Motion Compensation

For an inter coding block, local warped motion may be allowed when the following conditions are met: (1) the current block uses single reference prediction, (2) the width or height of the coding block is greater than or equal to eight, and (3) at least one of the adjacent neighboring blocks uses the same reference frame as the current block.

If local warped motion is used for the current block, the affine model parameters may be estimated by mean-squared minimization of the difference between the reference and modeled projections based on the MVs of the current block and its adjacent neighboring blocks. To estimate the parameters of local warped motion, if the neighboring block uses the same reference frame as the current block, a projection sample pair of the center sample in the neighboring block and its corresponding sample in the reference frame may be obtained. Subsequently, three extra samples may be created by shifting the center position by a quarter sample in one or both dimensions. These extra samples may also be considered as projection sample pairs to ensure the stability of the model parameter estimation process.

Figure 9:
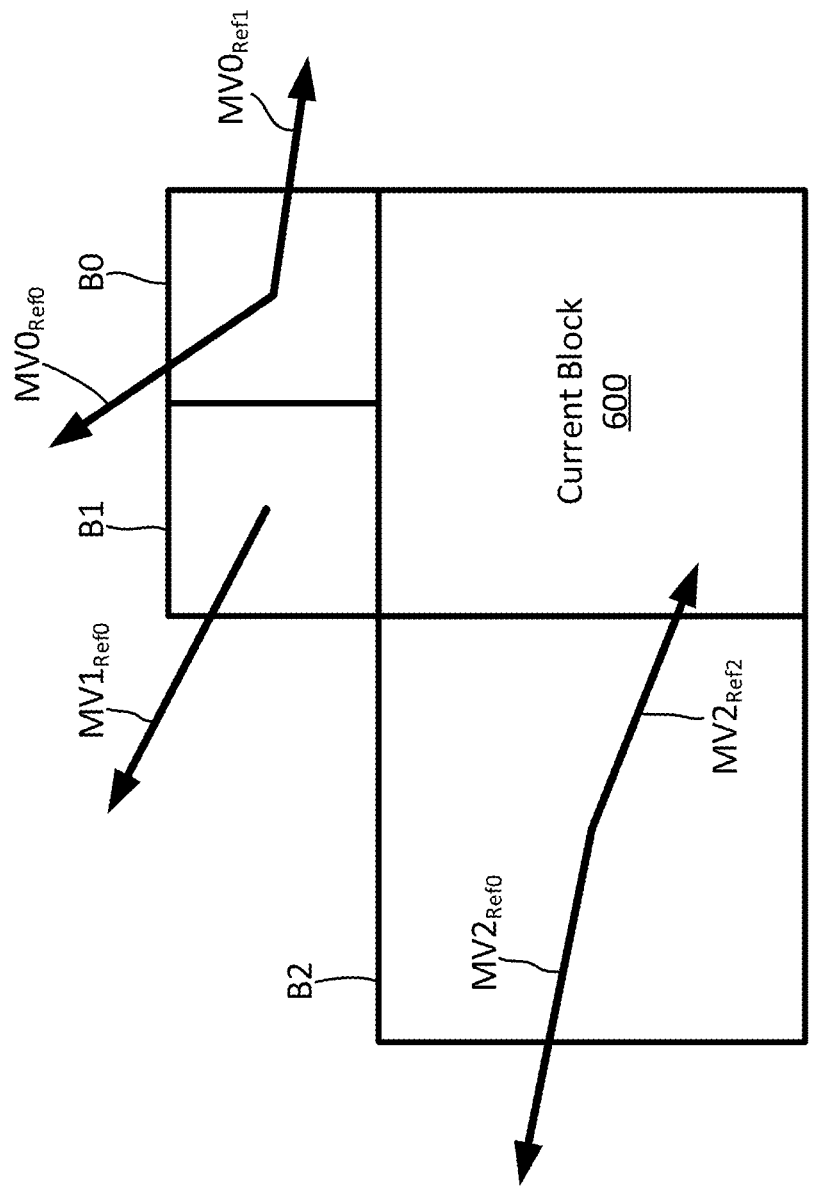
FIG. 9 is a schematic illustration of example motions samples used for deriving model parameters of a block using local warped motion predictions, in accordance with an embodiment.

The MVs of neighboring blocks, which are used to derive the motion parameters, may be referred to as motion samples. The motion samples may be selected from neighboring blocks that use the same reference frame as the current block. The warped motion prediction mode may be only enabled for blocks that use a single reference frame. For example, with reference to FIG. 9, the MVs of neighboring blocks B0, B1, and B2 are referred as MV0, MV1, and MV2, respectively. FIG. 9 illustrates example motions samples used for deriving model parameters of a block using local warped motion prediction, according to some embodiments. The current block 600 may be predicted using uni-prediction with reference frame Ref0. The neighboring block B0 may be predicted using compound prediction with reference frames Ref0 and Ref1. The neighboring block B1 may be predicted using uni-prediction with reference frame Ref0. The neighboring block B2 may be predicted using compound prediction with reference frames Ref0 and Ref2. The motion vector $MV0_{Ref0}$ of the neighboring block B0, the motion vector $MV1_{Ref0}$ of the neighboring block B1, and the motion vector $MV2_{Ref0}$ of the neighboring block B2 may be used as the motion samples for deriving the affine motion parameters of the current block 600.

3. Sample Collection Process of Local Warp Motion in AV1 and AVM

In local warp motion, to calculate the warp model using regression/least square error method, the samples and motion vectors of the neighboring block may be collected into a stack. In AV1 and AVM, one group of sample positions and its referencing positions pointed by its MV in the reference pictures may be collected. Up to eight pairs of positions may be stored in a stack for regression/least square error warp model computation.

Figure 10:
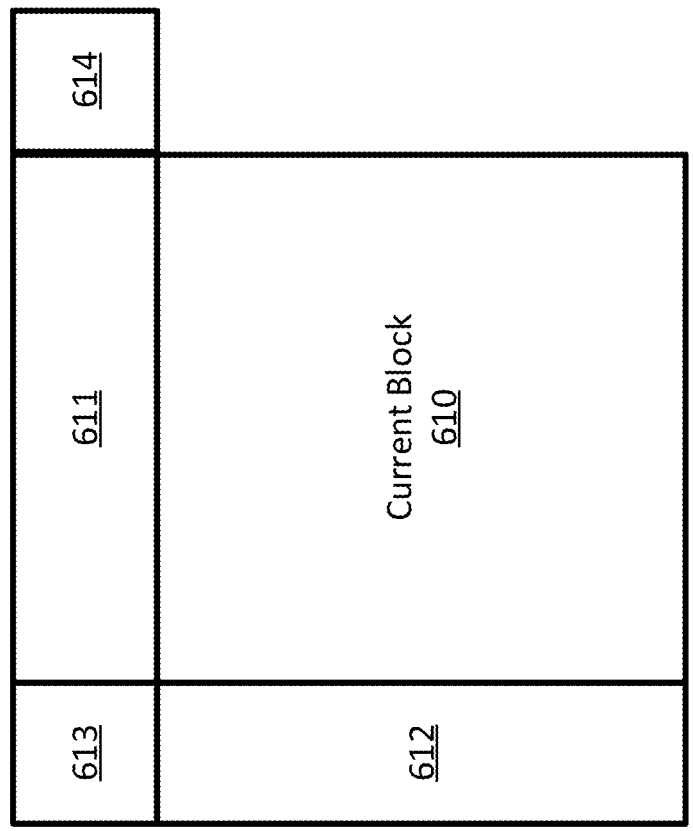
FIG. 10 is a schematic illustration of an example of a warp sample collection scanning order, in accordance with an embodiment.

FIG. 10 is a schematic illustration of an example of a warp sample collection scanning order. As shown in FIG. 10, only spatial neighboring blocks may be scanned. When a neighboring block has a same reference picture as the current block 610 (e.g., if the neighboring block is compound, one of the reference pictures is the same as the reference picture of the current block), the central position of the neighboring block, and the central position of the reference bock of the neighboring block, which is pointed by the MV of the neighboring block, may be collected. With reference to FIG. 10, the scan order may be defined as follows: (1) top row neighboring block(s) 611 are scanned; (2) left column neighboring block(s) 612 are scanned; (3) the top left neighboring block 613 is scanned; (4) the top right neighboring block 614 is scanned.

[Local Warp Extend Mode and Local Warp Delta Mode from CWG-C050]

In addition to translational motion, AVM also supports warped motion compensation. Two types of warped motion models are supported: a global warp model and a local warp model. The global warp model is associated with each reference frame, where each of the four non-translational parameters has 12-bit precision and the translational motion vector is coded in 15-bit precision. A coding block may choose to use it directly (provided the reference frame index). The global warp model captures the frame level scaling and rotation, and hence primarily focuses on the rigid motion over the entire frame.

In addition, a local warp model at coding block level is also supported. In a local warp mode, also known as WARPED_CAUSAL, the warp parameters of the current block may be derived by fitting a model to nearby motion vectors using least-squares.

1. Warp Extend Mode

A new warped motion mode is called WARP_EXTEND. In the WARP_EXTEND mode, the motion of a neighboring block is smoothly extended into the current block, but with some ability to modify the warp parameters. This allows complex warping motions to be represented, spread across multiple blocks, while minimizing blocking artifacts.

To accomplish this, the WARP_EXTEND mode, applied to NEWMV block, builds a new warp model based on two constraints: (1) the per-pixel motion vectors generated by the new warp model should be continuous with the per-pixel motion vectors in a neighboring block, and (2) the pixel at the center of the current block should have a per-pixel motion vector which matches the signaled motion vector for the block as a whole.

Figure 11:
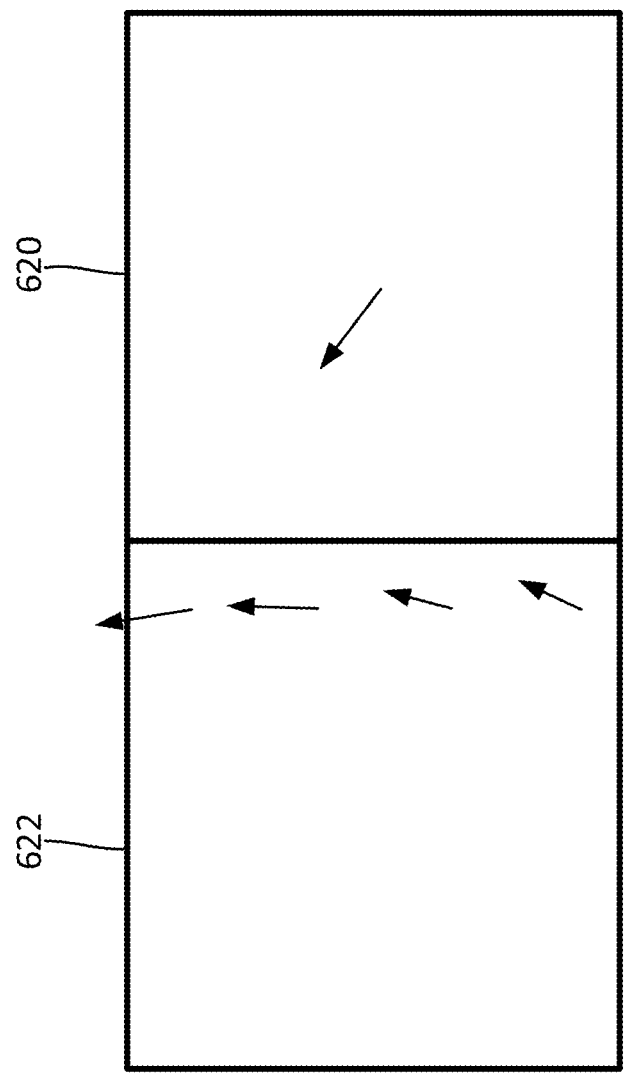
FIG. 11 is a schematic illustration of motion vectors in blocks using a warp extend mode, in accordance with an embodiment.

For example, with reference to FIG. 11, if a neighboring block 622 at the left of a current block 620 is warped, then a warp model may be used which fits the motion vectors. FIG. 11 illustrates motion vectors in blocks using a warp extend mode, according to some embodiments.

The above two constraints for building the new warp model may imply certain equations involving the warp parameters of the neighboring block and the current block. These equations may then be solved to calculate the warp model for the current block.

For example, if $(A, \ldots, F)$ represents the neighbor's warp model and $(A', \ldots, F')$ represents the new warp model, then the first constraint is as shown below in EQUATION 4, at each point along the common edge:

$$\begin{pmatrix} A' & B' \\ C' & D' \end{pmatrix}\begin{pmatrix} x \\ y \end{pmatrix} + \begin{pmatrix} E' \\ F' \end{pmatrix} = \begin{pmatrix} A & B \\ C & D \end{pmatrix}\begin{pmatrix} x \\ y \end{pmatrix} + \begin{pmatrix} E \\ F \end{pmatrix} \quad \text{(EQUATION 4)}$$

The points along the edge have different values of y, but they all have the same value of x. This means that the coefficients of y must be the same on both sides (i.e., B'=B and D'=D). Meanwhile, the x coefficients provide equations relating the other coefficients as shown below in EQUATIONS 5-8:

$B'=B$ (EQUATION 5)

$D'=D$ (EQUATION 6)

$A'x+E'=Ax+E$ (EQUATION 7)

$C'x+F'=Cx+F$ (EQUATION 8)

where, in EQUATIONS 7 and 8, x is the horizontal position of the vertical column of pixels, so is effectively a constant.

The second constraint specifies that the motion vector at the center of the block must equal the one signaled using the NEWMV mechanism. This provided two further equations, resulting in a system of six equations in six variables which has a unique solution.

These equations may be solved efficiently, both in software and in hardware. The solution may be solved using basic addition, subtraction, multiplication, and divisions by powers of 2. As such, this mode is significantly less complex than the least-squares based local warp mode.

According to embodiments, there may be multiple neighboring blocks which may be extended from. In such case, it is useful to have some way to choose which block to extend from. This problem is similar to a problem encountered in motion vector prediction. Specifically, there may be several possible motion vectors from nearby blocks, and one to use as the base for NEWMV coding should be selected.

A solution for the above problem may include extending to handle the needs of WARP_EXTEND. This may be done by tracking the source of each motion vector prediction. Then, WARP_EXTEND may be only enabled if the selected motion vector prediction was taken from a directly neighboring block. Then, that block may be used as the single "neighboring block" in the rest of the algorithm.

Sometimes the neighbor's warp model will be very good as-is, without needing any further modification. To make this case cheaper to code, WARP_EXTEND may be used for NEARMV blocks. The neighbor selection may be the same as for NEWMV, except that the selection in NEWMV requires the neighbor to be warped, not just translated. But if this is true, and WARP_EXTEND is selected, then the neighbor's warp model parameters may be copied to the current block.

2. Warp Delta Mode

In some embodiments, a motion mode called WARP_DELTA may be provided. In this mode, the block's warp model is coded as a delta from a predicted warp model, similar to how motion vectors are coded as a delta from a predicted motion vector. The prediction may be sourced from either the global motion model (if any), or a neighboring block.

To avoid having multiple ways to encode the same predicted warp model, the following restrictions may be applied: If the mode is NEARMV or NEWMV, then the same neighbor selection logic as described for WARP_EXTEND may be used. If this results in a neighboring block which is warped, then the block's model (without applying the rest of the WARP_EXTEND logic) may be used as the prediction. Otherwise, the global warp model may be used as a base.

Then, a delta for each of the non-translational parameters may be coded. Finally, the translational part of the model may be adjusted so that the per-pixel motion vector at the center of the block matches the block's overall motion vector.

As this tool (i.e., WARP_DELTA) involves explicitly coding a delta per warp parameter, it uses more bits to encode than the other warp modes. As such, WARP_DELTA may be disabled for blocks smaller than 16×16. However, the decode logic is extremely simple, and it can represent more complex motion that the other warp modes cannot.

[Merge with Motion Vector Difference (MMVD)]

Figure 12:
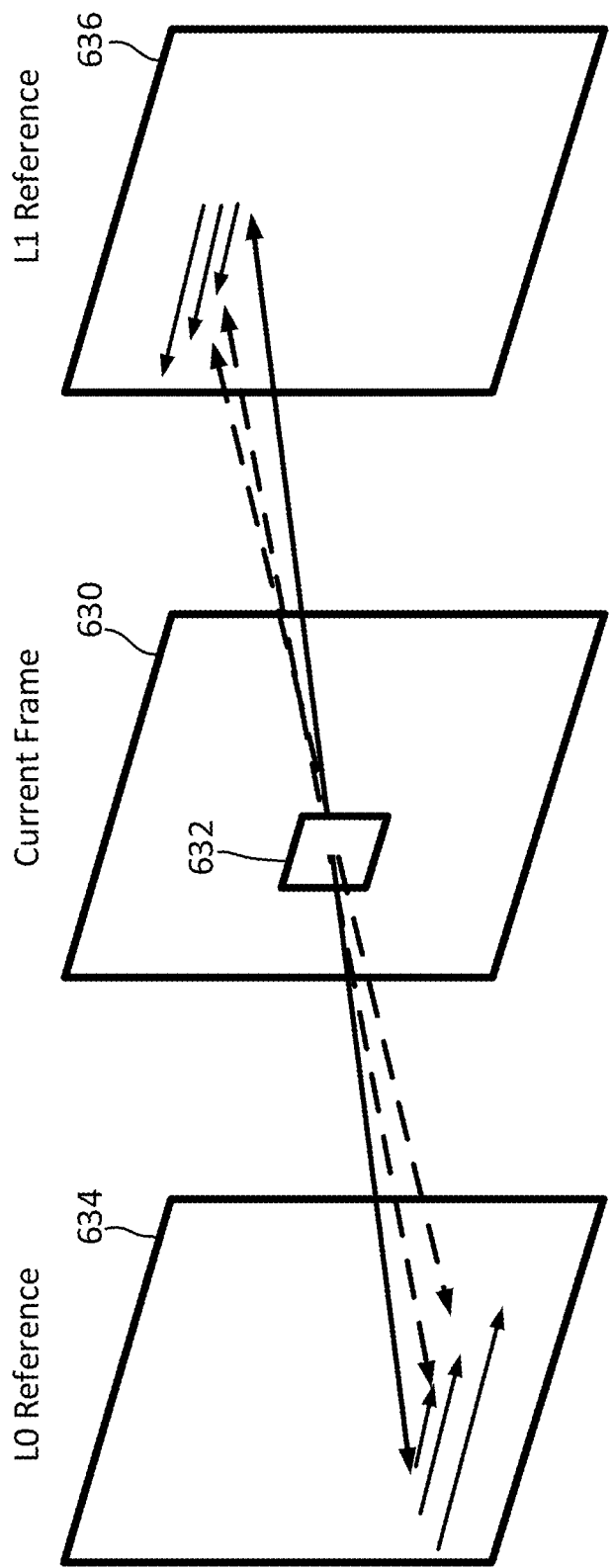
FIG. 12 is a schematic illustration of an MMVD search process of a current frame using two reference frames, in accordance with an embodiment.

Merge with Motion Vector Difference (MMVD) may be used for either skip or merge modes with a motion vector expression method. FIG. 12 illustrates an MMVD search process of a current frame 630, that includes a current block 632, using two reference frames 634 and 636 (e.g., the two reference frames shown in FIG. 8). MMVD re-uses merge candidates in VVC. Among the merge candidates, a candidate may be selected, and further expanded by the motion vector expression method. MMVD provides a new motion vector expression with simplified signaling. The expression method may include a starting point, a motion magnitude, and a motion direction. MMVD technique may use a merge candidate list of VVC. But only candidates which are default merge type (MRG_TYPE_DEFAULT_N) may be considered for MMVD's expansion. A base candidate index (IDX) may define the starting point. The base candidate IDX may indicate the best candidate among candidates in the list as, for example, shown below in TABLE 7:

TABLE 7

| Base candidate IDX | | | | |
|---|---|---|---|---|
| Base candidate IDX | 0 | 1 | 2 | 3 |
| $N^{th}$ MVP | $1^{st}$ MVP | $2^{nd}$ MVP | $3^{rd}$ MVP | $4^{th}$ MVP |

If the number of the base candidates is equal to 1, the base candidate IDX may not be signaled.

A distance index that represents motion magnitude information may be used. The distance index may indicate a predefined distance from the starting point information. The pre-defined distance may be as shown below in TABLE 8:

TABLE 8

| Distance IDX | | | | | | | | |
|---|---|---|---|---|---|---|---|---|
| Distance IDX | | | | | | | | |
| | 0 | 1 | 2 | 3 | 4 | 5 | 6 | 7 |
| Pixel distance | ¼-pel | ½-pel | 1-pel | 2-pel | 4-pel | 8-pel | 16-pel | 32-pel |

A direction index that represents the direction of the MVD relative to the starting point may be used. The direction index may represent the four directions as shown below in TABLE 9.

TABLE 9

| Direction IDX | | | | |
|---|---|---|---|---|
| Direction IDX | 00 | 01 | 10 | 11 |
| x-axis | + | − | N/A | N/A |
| y-axis | N/A | N/A | + | − |

An MMVD flag may be signaled right after sending a skip flag and a merge flag. If the skip flag and the merge flag are true, the MMVD flag may be parsed. If the MMVD flag is equal to 1, the MMVD syntaxes may be parsed. But, if not 1, an AFFINE flag may be parsed. If the AFFINE flag is equal to 1, then the AFFINE mode may be used. But, if not 1, the skip/merge index may be parsed for VTM's skip/merge mode.

Problem of Related Art

In the current warp delta signaling of CWG-C050, only two delta values for rotation and zoom warp is allowed. Besides, the delta values are signaled using fixed step length (also referred to as "size"). These are suboptimal for warp model corrections.

Example Embodiments

Embodiments of the present disclosure may be used separately or combined in any order. Further, each of the embodiments of the present disclosure (e.g., methods, encoder, and decoder) may be implemented by processing circuitry (e.g., one or more processors or one or more integrated circuits). In one example, the one or more processors execute a program that is stored in a non-transitory computer-readable medium. In the following, the term "block" may be interpreted as a prediction block, a coding block, or a coding unit (CU).

According to embodiments, the warp type (or how many parameters that are going to be corrected by delta values) is first signaled in the bitstream, and depending on the warp type, corresponding delta values are signaled in the bitstream. According to embodiments, at least one syntax element that explicitly indicates the warp type to be used (which indicates a number of parameters to be corrected by delta values), may be signaled in the bitstream by the encoder, and obtained from the bitstream by the decoder and used by the decoder to obtain a warp model and perform warped motion compensation based on the warp model to decode at least one coded picture of the bitstream. For example, a current block may be predicted by performing warped motion compensation using the warp model.

According to one or more embodiments, two different warp types may be signaled in the bitstream. The two warp types are (1) a rotation and zoom type that contains four parameters (including translational parameters), and (2) an affine type that includes six parameters. As an example, the four parameters of the rotation and zoom type may represented as [a, −b, e; b, a, f], and the six parameters of the affine type may be represented as [a, b, c; d, e, f]. Based on the rotation and zoom type being used, two delta values may be signaled (e.g., in the bitstream) to correct the parameters a and b, respectively. Based on the affine type being used, four delta values may be signaled (e.g., in the bitstream) to correct the parameters a, b, c, and d, respectively. According to embodiments, the decoder (or the encoder) may correct the parameters based on the signaled delta values and perform the warped motion compensation based on the corrected parameters. According to embodiments, the parameters may be motion parameters that define warp motion of the warp model, which has a warp type. According to embodiments, the decoder (or the encoder) may obtain the warp model (e.g., the corrected motion parameters) of, for example, the current block, based on the signaled delta values, and perform the warped motion compensation with respect to the current block based on the warp model obtained.

According to one or more embodiments, a syntax element, which indicates how many delta values are going to be used, is signaled. For example, if the value of the syntax element equals to 0, no delta value is signaled; if the value of the syntax element equals to 1, only a delta value that corrects parameter a is signaled; if the syntax element equals to 2, delta values (e.g., two respective delta values) that correct parameter a and b are signaled; if the syntax element equals to 3, delta values (e.g., three respective delta values) that correct parameters a, b, and c are signaled; if the syntax element equals to 4, delta values (e.g., four respective delta values) that correct parameters a, b, c and d are signaled. According to embodiments, the parameters e and f may be derived (e.g., by the decoder) using parameters a, b, c, d, and the MVs. Thus, they may not need additionally signaled delta values to be obtained. According to embodiments, the decoder (or encoder) may correct parameters (e.g., motion parameters) of a warp type based on the signaled delta values, derive other parameters (e.g., motion parameters) of the warp type from the corrected parameters, and perform the warped motion compensation based on the corrected parameters and the derived parameters. According to embodiments, the encoder may signal (e.g., in the bitstream), to the decoder, no delta value or one or more of the delta values based on the value of the syntax element.

According to embodiments, an adaptive step size, instead of the fixed step sizes of delta values can be used.

According to one or more embodiments, the step sizes are scaled from a predefined base step size, the scaling factor can be fractional or integer. The scaling factor can be signaled per block. According to embodiments, the encoder may signal a scaling factor corresponding to a block (e.g., the current block) in the bitstream to the decoder, and the decoder may obtain the scaling factor from the bitstream, scale the step size of the delta values based on the scaling factor and the predefined base step size, and perform the warped motion compensation (e.g., of the current block) based on the delta values and the scaled step size of the delta values. According to embodiments, the encoder may perform the same or similar functions of the decoder that are described above.

According to an embodiment, the supported/allowed scaling factors are stored in a predefined look-up table(s). Instead of directly signaling the scaling factors, an entry index in the table is signaled into the bitstream. According to embodiments, the index may identify a particular scaling factor stored in the predefined look-up table(s). According to embodiments, the encoder may select an index to be signaled, based on the predefined look-up table(s) and an obtained scaling factor, and signal the index in the bitstream. According to embodiments, the decoder may obtain the index from the bitstream and obtain the scaling factor based on the index and the predefined look-up table(s). According to an embodiment, the supported scaling factors in the look-up table may not evenly distributed, and the scaling factors may have finer granularity when the associated index of the scaling factors are closer to the zero index, and the scaling factors may have coarser granularity when associated index of the scaling factors is further from the zero index. For example, a difference between scaling factors corresponding to neighboring indexes may be smaller when closer to the zero index, and larger when farther from the zero index. In one example, the supported scaling factors in the look-up table are [1, 2, 4, 8, 16, 32].

According to one or more embodiments, the scaling factor can be derived depending on the magnitude of the translational MV (or parameter, e.g., parameters e, and f in a six-parameter warp model) of the current block. According to embodiments, the encoder and/or the decoder may derive the scaling factor.

According to one or more embodiments, the scaling factor can be derived based on shear parameters (e.g., alpha, beta, gamma, and theta), which are linearly derived from the warp model parameters and control the scope of the warp. According to embodiments, the encoder and/or the decoder may derive the shear parameters from the warp model parameters, and derive the scaling factor based on the shear parameters.

According to one or more embodiments, the scaling factor can be updated during the encoding based on coded information that is known to both encoder and decoder, such as the step sizes used by coded block sizes. According to embodiments, the encoder may update the scaling factor.

According to one or more embodiments, the step size may depend on other coded information, including but not limited to block size, prediction mode (e.g., whether NEW or NEAR mode is applied), step size used by neighboring blocks, one or multiple of the predicted warp parameters, whether a neighboring block is coded by warp model or translational model. According to embodiments, the step size may be obtained by the encoder and/or decoder based on the other coded information.

According to one or more embodiments, the step size may be unevenly distributed. For example, the step sizes may have finer granularity when closer to zero step size, and coarser granularity when further from the zero step size. For example, a difference between neighboring step sizes may be smaller when closer to the zero step size, and larger when farther from the zero step size.

According to embodiments, multiple classes of the delta values may be first predefined. The class (depending on the magnitude of the delta value) of the delta values are first signaled. In different classes, the step size (precision) of delta values can be different. According to embodiments, the class of the delta values may be signaled in the bitstream by the encoder. According to embodiments, the decoder may obtain the class of the delta values from the bitstream, and perform the warped motion compensation (e.g., of the current block) based on the delta values of the class.

According to embodiments, the signaling of the sign of the delta values can be hidden. That is, at the decoder side, warp predictors with position and negative delta values are constructed, the warp predictor from among the warp predictors that has the best smoothness with neighboring blocks may be determined and used as a final warp predictor for performing the warped motion compensation.

According to embodiments, the step size may be predicted from, or signaled using a context derived by coded information that is known to both encoder and decoder, including, but not limited to the step size used by neighboring blocks, whether the neighboring blocks are coded by a warp model or a translational model. According to embodiments, the encoder and/or the decoder may predict the step size based on the coded information.

According to embodiments, at least one processor and memory storing computer program instructions (i.e. computer code) may be provided. The computer program instructions, when executed by the at least one processor, may implement an encoder or a decoder and may perform any number of the functions described in the present disclosure, including the functions performed by the encoder or the decoder.

Figure 13:
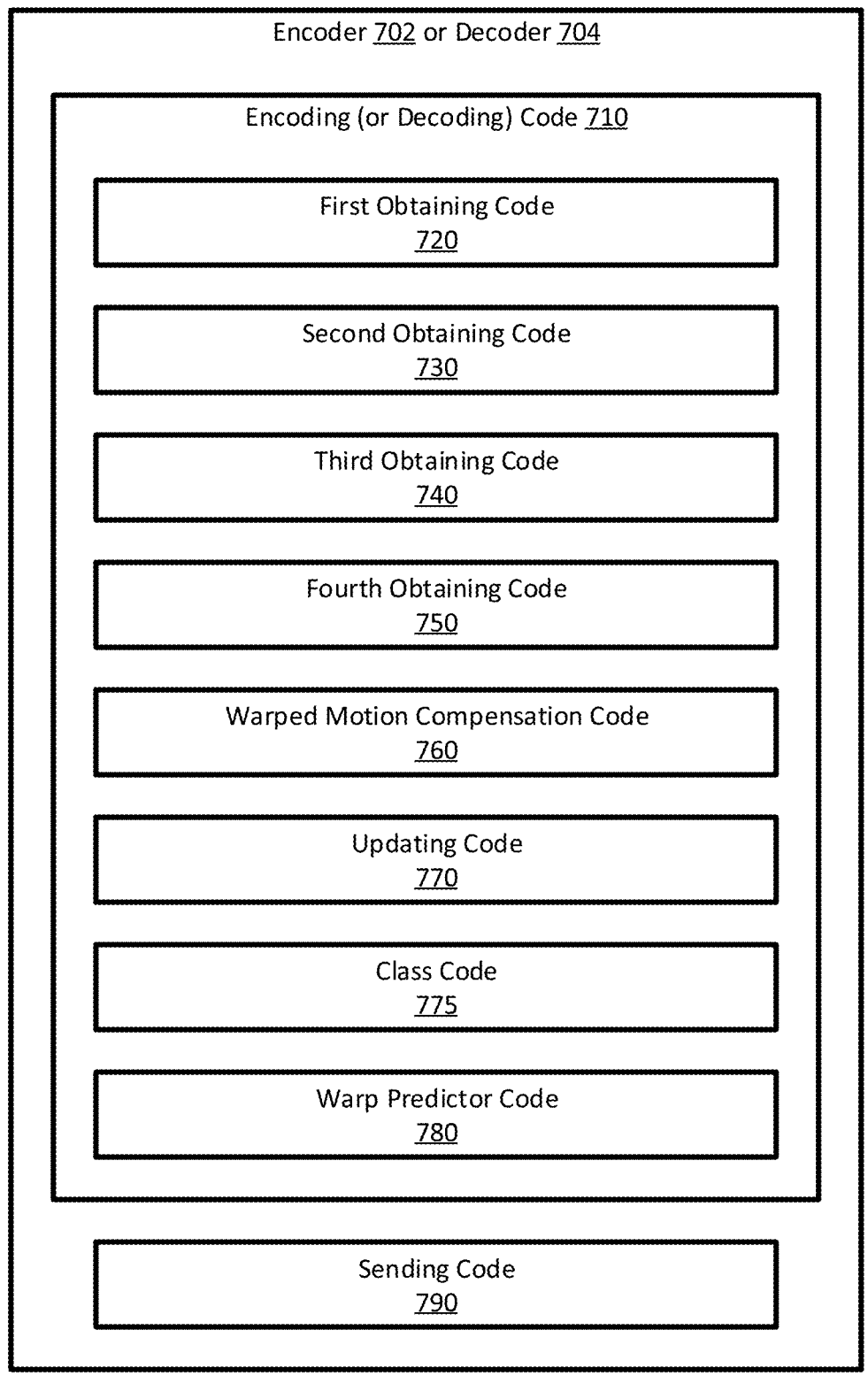
FIG. 13 is a block diagram of computer code according to embodiments.

For example, with reference to FIG. 13, the at least one processor may implement an encoder 702 or a decoder 704. The computer program instructions may include, for example, encoding (or decoding) code 710 that is configured to cause the at least one processor to code (or decode) at least one picture that is received in accordance with embodiments of the present disclosure. The encoding (or decoding) code 710 may include, for example, first obtaining code 720, second obtaining code 730, third obtaining code 740, fourth obtaining code 750, warped motion compensation code 760, updating code 770, class code 775, warp predictor code 780, and sending code 790. While example code that causes certain functions to be performed is described herein, it will be understood that embodiments of the present disclosure may include other code to perform any other functions described in the present disclosure.

The first obtaining code 720 may be configured to cause the at least one processor to obtain warp information in accordance with embodiments of the present disclosure. For example, the warp information may include a warp type indicating a number of parameters to be corrected by delta values, the number of parameters defining warp motion for predicting, for example, a current block of the coded picture, in accordance with embodiments of the present disclosure.

The second obtaining code 730 may be configured to cause the at least one processor to obtain at least one delta value that is a delta of at least one parameter that defines the warp motion for predicting, for example, the current block, in accordance with embodiments of the present disclosure.

The third obtaining code 740 may be configured to cause the at least one processor to obtain a warp model based on the warp information and the at least one delta value, in accordance with embodiments of the present disclosure. In one example, the warp model may be obtained by correcting the at least one parameter based on the at least one delta value, in accordance with embodiments of the present disclosure. In one example, the warp model may be obtained further based on a step size (e.g., an adaptive step size) of the at least one delta value, in accordance with embodiments of the present disclosure.

The fourth obtaining code 750 may be configured to cause the at least one processor to obtain the step size (e.g., an adaptive step size) of the at least one delta value, in accordance with embodiments of the present disclosure. In one example, the step size may be obtained by explicitly signaling (e.g., in the bitstream) or by deriving the step size, in accordance with embodiments of the present disclosure. In one example, the step size may be an adaptive step size that is obtained based on a scaling factor and a predefined base step size, in accordance with embodiments of the present disclosure.

The warped motion compensation code 760 may be configured to cause the at least one processor to predict, for example, the current block by performing warped motion compensation using the warp model, in accordance with embodiments of the present disclosure.

The updating code 770 may be configured to cause the at least one processor to update the scaling factor during encoding based on coded information that is known to both encoder and decoder, such as the step sizes used by coded block sizes, in accordance with embodiments of the present disclosure.

The class code 775 may be configured to cause the at least one processor to signal (e.g., in the bitstream) a class of the delta values, or obtain the class of the delta values from the bitstream for performing the warped motion compensation (e.g., of the current block) based on the delta values of the class, in accordance with embodiments of the present disclosure.

When the decoder 704 is provided, the warp predictor code 780 may be configured to cause the at least one processor to construct warp predictors with position and negative delta values, determine a warp predictor from among the warp predictors that has the best smoothness with neighboring blocks, and use the warp predictor as a final warp predictor for performing the warped motion compensation, in accordance with embodiments of the present disclosure.

When the encoder 702 is provided, the computer program instructions may further include, for example, sending code 790 that may be configured to cause the at least one processor to send a bitstream, including the picture(s) that is coded, to a decoder (e.g., the decoder 704) in accordance with embodiments of the present disclosure. The encoder 702 may provide information (e.g., syntax elements) related to warp motion in the bitstream, such as the information described in the present disclosure, in accordance with embodiments of the present disclosure.

The techniques of embodiments of the present disclosure described above, can be implemented as computer software using computer-readable instructions and physically stored in one or more computer-readable media. For example, FIG. 14 shows a computer system 900 suitable for implementing embodiments of the disclosed subject matter.

The computer software can be coded using any suitable machine code or computer language, that may be subject to assembly, compilation, linking, or like mechanisms to create code including instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

The components shown in FIG. 14 for computer system 900 are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system 900.

Computer system 900 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard 901, mouse 902, trackpad 903, touch screen 910, data-glove, joystick 905, microphone 906, scanner 907, and camera 908.

Computer system 900 may also include certain human interface output devices. Such human interface output devices may be stimulating the senses of one or more human users through, for example, tactile output, sound, light, and smell/taste. Such human interface output devices may include tactile output devices (for example tactile feedback by the touch-screen 910, data-glove, or joystick 905, but there can also be tactile feedback devices that do not serve as input devices). For example, such devices may be audio output devices (such as: speakers 909, headphones (not depicted)), visual output devices (such as screens 910 to include CRT screens, LCD screens, plasma screens, OLED screens, each with or without touch-screen input capability, each with or without tactile feedback capability-some of which may be capable to output two dimensional visual output or more than three dimensional output through means such as stereographic output; virtual-reality glasses (not depicted), holographic displays and smoke tanks (not depicted)), and printers (not depicted).

Computer system 900 can also include human accessible storage devices and their associated media such as optical media including CD/DVD ROM/RW 920 with CD/DVD or the like media 921, thumb-drive 922, removable hard drive or solid state drive 923, legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system 900 can also include interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses 949 (such as, for example USB ports of the computer system 900; others are commonly integrated into the core of the computer system 900 by attachment to a system bus as described below (for example Ethernet interface into a PC computer system or cellular network interface into a smartphone computer system). Using any of these networks, computer system 900 can communicate with other entities. Such communication can be uni-directional, receive only (for example, broadcast TV), uni-directional send-only (for example CANbus to certain CANbus devices), or bi-directional, for example to other computer systems using local or wide area digital networks. Such communication can include communication to a cloud computing environment 955. Certain protocols and protocol stacks can be used on each of those networks and network interfaces as described above.

Aforementioned human interface devices, human-accessible storage devices, and network interfaces 954 can be attached to a core 940 of the computer system 900.

The core 940 can include one or more Central Processing Units (CPU) 941, Graphics Processing Units (GPU) 942, specialized programmable processing units in the form of Field Programmable Gate Areas (FPGA) 943, hardware accelerators 944 for certain tasks, and so forth. These devices, along with Read-only memory (ROM) 945, Random-access memory 946, internal mass storage such as internal non-user accessible hard drives, SSDs, and the like 947, may be connected through a system bus 948. In some computer systems, the system bus 948 can be accessible in the form of one or more physical plugs to enable extensions by additional CPUs, GPU, and the like. The peripheral devices can be attached either directly to the core's system bus 948, or through a peripheral bus 949. Architectures for a peripheral bus include PCI, USB, and the like. A graphics adapter 950 may be included in the core 940.

CPUs 941, GPUs 942, FPGAs 943, and accelerators 944 can execute certain instructions that, in combination, can make up the aforementioned computer code. That computer code can be stored in ROM 945 or RAM 946. Transitional data can be also be stored in RAM 946, whereas permanent data can be stored for example, in the internal mass storage 947. Fast storage and retrieve to any of the memory devices can be enabled through the use of cache memory, that can be closely associated with one or more CPU 941, GPU 942, mass storage 947, ROM 945, RAM 946, and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system 900 having architecture, and specifically the core 940 can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core 940 that are of non-transitory nature, such as core-internal mass storage 947 or ROM 945. The software implementing various embodiments of the present disclosure can be stored in such devices and executed by core 940. A computer-readable medium can include one or more memory devices or chips, according to particular needs. The software can cause the core 940 and specifically the processors therein (including CPU, GPU, FPGA, and the like) to execute particular processes or particular parts of particular processes described herein, including defining data structures stored in RAM 946 and modifying such data structures according to the processes defined by the software. In addition or as an alternative, the computer system can provide functionality as a result of logic hardwired or otherwise embodied in a circuit (for example: accelerator 944), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several non-limiting example embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method performed by a decoder, the method comprising:
   receiving a bitstream that includes a coded picture;
   obtaining warp information that is signaled in the bitstream, the warp information including a warp type indicating a number of parameters to be corrected by delta values, the number of parameters defining warp motion for predicting a current block of the coded picture;
   obtaining at least one delta value from the bitstream that is a delta of at least one parameter that defines the warp motion for predicting the current block;
   obtaining a warp model based on the warp information and the at least one delta value; and
   predicting the current block by performing warped motion compensation using the warp model.

2. The method of claim 1, wherein the warp type is a rotation and zoom type that includes four parameters that define the warp motion,
   the at least one delta value that is obtained is two delta values for correcting two parameters among the four parameters, and
   the obtaining the warp model comprises correcting the two parameters based on the two delta values.

3. The method of claim 1, wherein the warp type is an affine type that includes six parameters that define the warp motion,
   the at least one delta value that is obtained is four delta values for correcting four parameters among the six parameters, and
   the obtaining the warp model comprises correcting the four parameters based on the four delta values.

4. The method of claim 1, wherein the warp information includes the number of parameters, which define the warp motion, that are to be corrected by the delta values, and
   a number of the at least one delta value that is obtained is equal to the number of parameters, of the warp information, that are to be corrected by the delta values.

5. The method of claim 1, wherein further comprising obtaining an adaptive step size of the at least one delta value, and
   the obtaining the warp model comprises obtaining the warp model based on the adaptive step size.

6. The method of claim 5, wherein the obtaining the adaptive step size comprises:
   obtaining a scaling factor; and
   calculating the adaptive step size based on a predefined base step size and the scaling factor.

7. The method of claim 6, wherein the obtaining the scaling factor comprises:
   obtaining an index that indicates the scaling factor from among a plurality of scaling factors stored within a look-up table; and
   obtaining the scaling factor based on the index and the look-up table.

8. The method of claim 6, wherein the obtaining the scaling factor comprises deriving the scaling factor based on a magnitude of a translation motion vector of the current block.

9. The method of claim 6, wherein the obtaining the scaling factor comprises deriving the scaling factor based on shear parameters.

10. The method of claim 5, wherein the obtaining the adaptive step size comprises obtaining the adaptive step size based on at least one from among a block size, a prediction mode, a step size used by at least one neighboring block of the current block, one or more of predicted warp parameters, and whether a neighboring block of the current block was coded by a warp model or a translational model.

11. A system comprising:
    at least one memory configured to store computer program code; and
    at least one processor configured to receive a bitstream that comprises a coded picture, access the computer program code and operate as instructed by the computer program code, the computer program code comprising:
      first obtaining code configured to cause the at least one processor to obtain warp information that is signaled in the bitstream, the warp information comprising a warp type indicating a number of parameters to be corrected by delta values, the number of parameters defining warp motion for predicting a current block of the coded picture;
      second obtaining code configured to cause the at least one processor to obtain at least one delta value from the bitstream that is a delta of at least one parameter that defines the warp motion for predicting the current block;
      third obtaining code to cause the at least one processor to obtain a warp model based on the warp information and the at least one delta value; and
      warped motion compensation code configured to cause the at least one processor to predict the current block by performing warped motion compensation using the warp model.

12. The system of claim 11, wherein the warp type is a rotation and zoom type that comprises four parameters that define the warp motion,
    the at least one delta value that is obtained is two delta values for correcting two parameters among the four parameters, and
    the third obtaining code is configured to cause the at least one processor to correct the two parameters based on the two delta values.

13. The system of claim 11, wherein the warp type is an affine type that comprises six parameters that define the warp motion,
    the at least one delta value that is obtained is four delta values for correcting four parameters among the six parameters, and
    the third obtaining code is configured to cause the at least one processor to correct the four parameters based on the four delta values.

14. The system of claim 11, wherein the warp information comprises the number of parameters, which define the warp motion, that are to be corrected by the delta values, and
    a number of the at least one delta value that is obtained is equal to the number of parameters, of the warp information, that are to be corrected by the delta values.

15. The system of claim 11, wherein the computer program code further comprises fourth obtaining code configured to cause the at least one processor to obtain an adaptive step size of the at least one delta value, and the third obtaining code is configured to cause the at least one processor to obtain the warp model based on the adaptive step size.

16. The system of claim 15, wherein the fourth obtaining code is configured to cause the at least one processor to:
obtain a scaling factor; and
calculate the adaptive step size based on a predefined base step size and the scaling factor.

17. The system of claim 16, wherein the fourth obtaining code is configured to cause the at least one processor to obtain the scaling factor by:
obtaining an index that indicates the scaling factor from among a plurality of scaling factors stored within a look-up table; and
obtaining the scaling factor based on the index and the look-up table.

18. The system of claim 16, wherein the fourth obtaining code is configured to cause the at least one processor to obtain the scaling factor by deriving the scaling factor based on a magnitude of a translation motion vector of the current block.

19. The system of claim 16, wherein the fourth obtaining code is configured to cause the at least one processor to obtain the scaling factor by deriving the scaling factor based on shear parameters that indicate shear motion.

20. A non-transitory computer-readable medium storing computer code that is configured to, when executed by at least one processor, cause the at least one processor to implement a decoder that:

receives a bitstream that includes a coded picture;

obtains warp information that is signaled in the bitstream, the warp information including a warp type indicating a number of parameters to be corrected by delta values, the number of parameters defining warp motion for predicting a current block of the coded picture;

obtains at least one delta value from the bitstream that is a delta of at least one parameter that defines the warp motion for predicting the current block;

obtains a warp model based on the warp information and the at least one delta value; and predicts the current block by performing warped motion compensation using the warp model.

\* \* \* \* \*